US012281207B2

(12) United States Patent
Côté et al.

(10) Patent No.: US 12,281,207 B2
(45) Date of Patent: Apr. 22, 2025

(54) METHODS OF RECYCLING POLYSTYRENE MATERIAL COMPRISING BROMINATED CONTAMINANTS

(71) Applicant: POLYSTYVERT INC., Anjou (CA)

(72) Inventors: Roland Côté, St-Antoine-sur-Richelieu (CA); Jean-Mathieu Pin, Anjou (CA)

(73) Assignee: POLYSTYVERT INC., Anjou (CA)

( * ) Notice: Subject to any disclaimer, the term of this patent is extended or adjusted under 35 U.S.C. 154(b) by 0 days.

(21) Appl. No.: 18/708,857

(22) PCT Filed: Nov. 11, 2022

(86) PCT No.: PCT/CA2022/051666
§ 371 (c)(1),
(2) Date: May 9, 2024

(87) PCT Pub. No.: WO2023/082009
PCT Pub. Date: May 19, 2023

(65) Prior Publication Data
US 2025/0011564 A1    Jan. 9, 2025

Related U.S. Application Data

(60) Provisional application No. 63/278,482, filed on Nov. 11, 2021.

(51) Int. Cl.
*C08J 11/08*    (2006.01)
(52) U.S. Cl.
CPC ............ *C08J 11/08* (2013.01); *C08J 2315/02* (2013.01); *C08J 2325/06* (2013.01)
(58) Field of Classification Search
USPC ...................................................... 521/44.5
See application file for complete search history.

(56) References Cited

U.S. PATENT DOCUMENTS

| | | |
|---|---|---|
| 3,043,785 A | 7/1962 | Wright et al. |
| 3,836,486 A | 9/1974 | Hafner |
| 4,003,881 A | 1/1977 | Sidebotham et al. |
| 4,031,039 A | 6/1977 | Mizumoto et al. |
| 4,067,826 A | 1/1978 | Emery |
| 4,071,479 A | 1/1978 | Broyde et al. |
| 4,360,486 A | 11/1982 | Dibiasi et al. |
| 5,232,954 A | 8/1993 | Peters |
| 5,269,948 A | 12/1993 | Krutchen |
| 5,278,282 A | 1/1994 | Nauman et al. |
| 5,438,079 A | 8/1995 | Paris |
| 5,552,494 A | 9/1996 | Iwamoto et al. |
| 5,594,035 A | 1/1997 | Walsh |
| 5,596,045 A | 1/1997 | Scherzer et al. |
| 5,629,352 A | 5/1997 | Shiino et al. |
| 5,824,709 A | 10/1998 | Suka |
| 5,859,072 A | 1/1999 | Emori |
| 5,891,403 A | 4/1999 | Badger et al. |
| 5,994,417 A | 11/1999 | Roberts et al. |
| 6,034,142 A | 3/2000 | Varadarajan et al. |
| 6,090,862 A | 7/2000 | Tatsuda et al. |
| 6,169,121 B1 | 1/2001 | Noguchi et al. |
| 6,326,408 B1 | 12/2001 | Jura |
| 6,403,661 B1 | 6/2002 | Usui et al. |
| 6,440,306 B1 | 8/2002 | Ditter et al. |
| 6,500,872 B1 | 12/2002 | Noguchi et al. |
| 6,548,561 B1 | 4/2003 | Müller et al. |
| 7,728,047 B2 | 6/2010 | Notari et al. |
| 7,745,503 B2 | 6/2010 | Notari et al. |
| 7,893,195 B2 | 2/2011 | Fassiau et al. |
| 8,071,656 B2 | 12/2011 | Waibel et al. |
| 8,138,232 B2 | 3/2012 | Maeurer et al. |
| 8,225,937 B2 | 7/2012 | Schlummer et al. |
| 8,242,212 B2 | 8/2012 | Grossetete et al. |
| 8,314,207 B2 | 11/2012 | Friedalender |
| 8,389,636 B2 | 3/2013 | Grossetete et al. |
| 8,546,455 B2 | 10/2013 | Poutch et al. |
| 8,609,778 B1 | 12/2013 | Frost et al. |
| 8,809,459 B2 | 8/2014 | Grossetete et al. |
| 8,912,296 B1 | 12/2014 | Bouquet et al. |

(Continued)

FOREIGN PATENT DOCUMENTS

| | | |
|---|---|---|
| AU | 7989775 A | 10/1976 |
| AU | 703220 B2 | 3/1997 |

(Continued)

OTHER PUBLICATIONS

Grause, G. et al. "A novel process for the removal of bromine from styrene polymers containing brominated flame retardant" Polymer Degradation and Stability 2015 112, 86-93 (Year: 2015).*

Schlummer,, M. et al. "Recycling of Styrene Polymers from Shredded Screen Housings Containing Brominated Flame Retardants" Journal of Applied Polymer Science 2006, 102, 1262-173 (Year: 2006).*

Abstract of D. S. Achilias et al., "Recycling of polymers from plastic packaging materials using the dissolution-reprecipitation technique", Polymer Bulletin, 63, 449-465 (May 13, 2009).

Abstract of Garcia et al., "Recycling extruded polystyrene by dissolution with suitable solvents", Journal of Material Cycles and Waste Management, Jan. 2009, vol. 11, Issue 1, pp. 2-5.

Anderson et al., "Chemical Recycling of Mixed Plastics in Electronic Waste Using Solvent-Based Processing", Processes, Jan. 2022, 10, 66.

(Continued)

*Primary Examiner* — Terressa Boykin
(74) *Attorney, Agent, or Firm* — SMART & BIGGAR LP

(57) ABSTRACT

The present disclosure relates to methods of removing brominated contaminants from polystyrene waste and recovering the brominated contaminants. The present disclosure further relates to methods of recycling polystyrene waste, wherein the recycling comprises retention of brominated contaminants or removal of contaminants. The present disclosure also relates to use of monocyclic aromatic benzenic solvents in the removal and/or recovery of brominated contaminants from polystyrene waste and in the recycling of polystyrene waste. Moreover, the present disclosure relates to use of the recovered brominated contaminants in the manufacture of polystyrene products such as insulation.

19 Claims, 3 Drawing Sheets

(56) References Cited

U.S. PATENT DOCUMENTS

Figure 1:
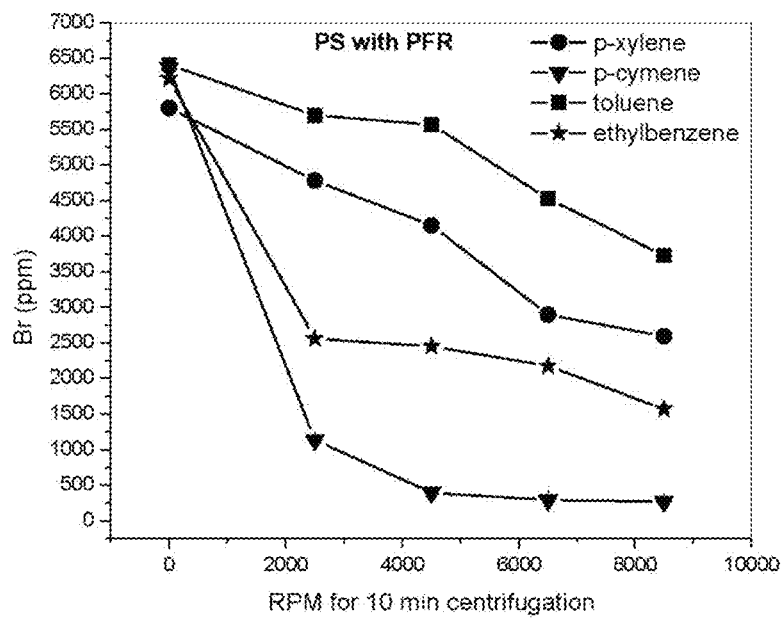

| | | | |
|---|---|---|---|
| 8,969,638 | B2 | 3/2015 | Tippet et al. |
| 9,045,612 | B2 | 6/2015 | Fluck et al. |
| 9,650,313 | B2 | 5/2017 | Tippet et al. |
| 9,664,175 | B2 | 5/2017 | Vander Lind et al. |
| 9,695,259 | B2 | 7/2017 | Layman et al. |
| 9,896,556 | B2 | 2/2018 | Gila et al. |
| 10,882,940 | B2 | 1/2021 | Moyses et al. |
| 10,961,367 | B2 | 3/2021 | Côté |
| 11,407,878 | B2 | 8/2022 | Côté |
| 2002/0062054 | A1 | 5/2002 | Cistone et al. |
| 2003/0191202 | A1 | 10/2003 | Maurer et al. |
| 2004/0229965 | A1 | 11/2004 | Maurer et al. |
| 2005/0056813 | A1 | 3/2005 | Hamano |
| 2006/0241193 | A1 | 10/2006 | Notari et al. |
| 2007/0112081 | A1 | 5/2007 | Hahn et al. |
| 2007/0249741 | A1 | 10/2007 | Yuan |
| 2007/0265361 | A1 | 11/2007 | Maurer et al. |
| 2008/0221228 | A1 | 9/2008 | Notari et al. |
| 2008/0281002 | A1 | 11/2008 | Maeurer et al. |
| 2009/0130383 | A1 | 5/2009 | Harelle |
| 2010/0222532 | A1 | 9/2010 | Shuler et al. |
| 2011/0021647 | A1 | 1/2011 | Poutch et al. |
| 2013/0005912 | A1 | 1/2013 | Wang et al. |
| 2017/0022346 | A1 | 1/2017 | Weeden, Jr. |
| 2017/0298207 | A1 | 10/2017 | Côté |
| 2017/0299207 | A1 | 10/2017 | Trevelyan |
| 2018/0022888 | A1 | 1/2018 | Li et al. |
| 2020/0165407 | A1 | 5/2020 | Côté |
| 2020/0317884 | A1 | 10/2020 | Côté |
| 2021/0380777 | A1 | 12/2021 | Côté |
| 2022/0315749 | A1 | 10/2022 | Deleye et al. |
| 2023/0002583 | A1 | 1/2023 | Côté |

FOREIGN PATENT DOCUMENTS

| | | | |
|---|---|---|---|
| CA | 2297807 | A1 | 2/1999 |
| CA | 2274397 | A1 | 12/1999 |
| CA | 2615848 | C | 1/2007 |
| CA | 2959082 | A1 | 4/2016 |
| CN | 1143653 | C | 2/1997 |
| CN | 101307150 | A | 11/2008 |
| CN | 101367956 | A | 2/2009 |
| CN | 107641216 | A | 1/2018 |
| CN | 111257270 | A | 6/2020 |
| DE | 4319180 | A1 | 1/1994 |
| DE | 4343784 | A1 | 7/1994 |
| DE | 19735827 | A1 | 2/1999 |
| DE | 10 2005 026451 | A1 | 12/2006 |
| EP | 0430496 | A1 | 6/1991 |
| EP | 0491836 | B1 | 7/1992 |
| EP | 894818 | A1 | 2/1999 |
| EP | 0949293 | A2 | 10/1999 |
| EP | 1462474 | A1 | 9/2004 |
| EP | 1616903 | A1 | 1/2006 |
| EP | 2865708 | A1 | 4/2015 |
| EP | 2553017 | A1 | 6/2016 |
| EP | 2276801 | B1 | 3/2017 |
| EP | 3575353 | A1 | 4/2019 |
| EP | 2513212 | B1 | 4/2021 |
| EP | 3853297 | A1 | 7/2021 |
| GB | 856577 | A | 12/1960 |
| JP | 093239 | A | 1/1997 |
| JP | H10195232 | A | 7/1998 |
| JP | H10338768 | A | 12/1998 |
| JP | H1180418 | A | 3/1999 |
| JP | 2000248109 | A | 9/2000 |
| JP | 2001172423 | A | 6/2001 |
| JP | 2002224652 | A | 8/2002 |
| JP | 2002-264129 | A | 9/2002 |
| JP | 2004051620 | A | 2/2004 |
| JP | 2005154525 | A | 6/2005 |
| JP | 2005162847 | A | 6/2005 |
| JP | 2007144829 | A | 6/2007 |
| JP | 2008063511 | A | 3/2008 |
| JP | 2015160900 | A | 9/2015 |
| JP | 2016010906 | A1 | 1/2016 |
| KR | 20220170372 | A | 12/2022 |
| WO | 1994024194 | A1 | 10/1994 |
| WO | 1995000582 | A1 | 1/1995 |
| WO | 2003087215 | A1 | 1/1995 |
| WO | 200214413 | A1 | 2/2002 |
| WO | 2002048246 | A1 | 6/2002 |
| WO | 2005123817 | A1 | 12/2005 |
| WO | 2007003691 | A1 | 1/2007 |
| WO | 2007009559 | A1 | 1/2007 |
| WO | 2008016815 | A2 | 2/2008 |
| WO | 2010098900 | A1 | 9/2010 |
| WO | 2011123597 | A1 | 10/2011 |
| WO | WO2015199561 | | 12/2015 |
| WO | 2016049782 | A1 | 4/2016 |
| WO | 2017064292 | A1 | 4/2017 |
| WO | 2020/082184 | A1 | 4/2020 |
| WO | 2021/043545 | A1 | 3/2021 |
| WO | 2022144158 | A1 | 7/2022 |
| WO | 2023012695 | A1 | 2/2023 |
| WO | 2003035729 | A2 | 5/2023 |

OTHER PUBLICATIONS

Cigna et al., "Dynamic Mechanical Properties, Structure, and Composition of Impact Polystyrene", Journal of Applied Polymer Science, vol. 14, pp. 1781-1793 (1970).
Cowie et al., "Polymer-cosolvent systems: 5. Upper and lower critical solution temperatures of polystyrene in n-alkanes", Polymer, Nov. 1983, vol. 24, pp. 1445-1448.
CreaCycle GmbH, "PolyStyrene-Loop (2016)—CreaSolv Pilot Plant", [online], [retrieved on Mar. 30, 2017]. Retrieved from the Internet <URL:http://www.creacycle.de/en/projects/recycling-of-expanded-poly-styrene-eps/polystyrene-loop-2016.html>, Jan. 1, 2016.
CreaCycle GmbH, "The CreaSolv Process", [online], [retrieved on Mar. 30, 2017]. Retrieved from the Internet <URL: http://www.creacycle.de/en/the-process.html>, Mar. 30, 2017.
CreaCycle GmbH, "CreaSolv Closing the PS Loop: Our contribution to the concept of Circular Economy". Retrieved from the Internet <URL: http://www.creacycle.de/en/projects/recycling-of-expanded-poly-styrene-eps/polystyrene-loop-2016.html>, May 25, 2016.
CreaSolv, "Closing the PS Loop: Our contribution to the concept of Circular Economy", CreaSolv process plus a bromine recovery for removal of HBCDD and destruction into bromine to be used in a new sustainable polymeric FR (2018).
English Abstract—Machine Generated of RO88225B, "Process for Purifying Sewage Resulting From Polystyren Fabrication", published on Dec. 31, 1985.
English Abstract and claims of EP1438351A2, "Recycling of waste expanded polystyrene foams to give products which may be re-expanded", published on Jul. 21, 2004.
English Abstract of CN101928405(A), "Method for reproducing PS (Polystyrene) raw material by recovering and separating high-polymer film composite waste plastics", published on Dec. 29, 2010.
English Abstract of CN102675684(A), "Method for extracting polycarbonate from polycarbonate blending modification material", published on Sep. 19, 2012.
English Abstract of CN103224646(A), "Novel technological method for recovering waste polystyrene foam plastics", published on Jul. 31, 2013.
English Abstract of CN1063883(A), "Method for preparation of coating from recovered foam polystyrene", published on Aug. 26, 1992.
English Abstract of CN107443614(A), "Method of improving transparency of regenerated plastics", published on Dec. 8, 2017.
English Abstract of CN1080645(A), "Waste polystyrene recovery and utilization device and process", published on Jan 12, 1994.
English Abstract of CN1103874(A), "Recovering waste foam polystyrene by gel foam remolding method and regenerating foamable polystyrene", published on Jun. 21, 1995.
English Abstract of CN1749297(A), "Method for recovering waste polystyrene foam plastic", published on Mar. 22, 2006.

(56) References Cited

OTHER PUBLICATIONS

English Abstract of CN86100803(A), "Method for recovering waste polystyrene", published on Sep. 23, 1987.
English Abstract of DE10207333(A1), "Re-expandable polystyrene production involves dissolving expanded polystyrene waste in polar solvent and precipitation with less polar precipitant also acting as blowing agent", published on May 15, 2003.
English Abstract of DE10207336(A1), "Densification and purification of foamed polystyrene waste for recycling, by dissolution in specific solvent, e.g. alkylene glycol dialkyl ether, and precipitation, preferably with alcohol", published on May 15, 2003.
English Abstract of DE19751442(A1), "Recovery of polystyrene from waste material", published on May 27, 1999.
English Abstract of DE2434925(A1), "Polyvinyl chloride recovery from plastic waste—by dissolving in solvent pptg. with non-solvent, sep. solid and recovering plasticiser", published on Feb. 12, 1976.
English Abstract of EP0894818(A1), "Process for recycling soluble polymers or polymer blends from plastic containing materials", published on Feb. 3, 1999.
English Abstract of JP2005179466(A), "Recycling apparatus for foamed polystyrene", published on Jul. 7, 2005.
English Abstract of JP2009120682(A), "Natural solvent for reducing volume of foamed polystyrene, and method for volume-reducing treatment of foamed polystyrene using the same", published on Jun. 4, 2009.
English Abstract of Poulakis et al., "Dissolution/reprecipitation: A model process for PET bottle recycling", Journal of Applied Polymer Science 81(1):91-95, Jul. 2001.
English Abstract of Poulakis et al., "Recycling of polypropylene by the dissolution/reprecipitation technique: I. A model study", Resources Conservation and Recycling 20(1):31-41, Jun. 1997.
English Abstract of Poulakis et al., "The dissolution/reprecipitation technique applied on high-density polyethylene: I. Model recycling experiments", Advanced in Polymer Technology, First published: Autumn (Fall) 1995.
English Abstract of TW200502282(A), "Method of recycling solid waste polystyrene packing materials", published on Jan. 16, 2005.
English Abstract of WO2006098287(A1), "Method and apparatus for recovering (rubber-reinforced) styrene resin composition", published on Sep. 21, 2006.
English Translation—Machine Generated of DE19735827A1, "Polymerization of Styrene in Presence of Ethyl Benzene and Contaminants", published on Feb. 25, 1999.
English Translation—Machine Generated of JP2005154525A, "Method and Apparatus for Treating Polystyrene-Based Resin Composition", published on Jun. 16, 2005.
English Translation—Machine Generated of KR20220170372A, "Waste Plastic Recycling Process", published on Dec. 29, 2022.
English Translation—Machine Translated of CN101367956A, "Method for recycling polystyrene foamed plastic with vegetable fat methyl ester production as volume reduction agent", published on Feb. 18, 2009.
English Translation—Machine Translated of CN1143653A, "Method for recovering waste polystyrene plastics", published on Feb. 26, 1997.
English Translation—Machine Translated of DE4343784A1, "Polyamid-Rückgewinnung", published on Jul. 14, 1994.
English Translation—Machine Translated of JP2000248109A, "Method of Recycling Styrene-Based Synthetic Resin", published on Sep. 12, 2000.
English Translation—Machine Translated of JP2001172423A, "Method and Apparatus for Recovering Polystyrene", published on Jun. 26, 2001.
English Translation—Machine Translated of JP2004051620A, "Method for Recovering Useful Product from Waste Plastic", published on Feb. 19, 2004.
English Translation—Machine Translated of JPH10195232A, "Continuous Production for Carrying Out Recycling of Expanded Polystyrene by Precipitation", published on Jul. 28, 1998.

English Translation—Machine Translated of JPH10338768A, "Production for Carrying Out Recycling of Expanded Polystyrene with Dissolution and Precipitation using Simple Substance Solvent", published on Dec. 22, 1998.
English Translation—Machine Translated of JPH1180418A, "Volume Reduction Method and Recycling Method for Foamed polystyrene", published on Mar. 26, 1999.
English Translation—Machine Translated of WO9500582A1, "Processes for Recycling Waste Polystyrene Foam", published on Jan. 5, 1995.
English Translation—Machine Translation of CN101307150(A), "Novel method for recovering waste and old polystyrol", published on Nov. 19, 2008.
English Translation—Machine Translation of CN107641216(A), "Recycling method of expanded polystyrene waste", published on Jan. 30, 2018.
English Translation—Machine Translation of EP3016998A1, "Method for increasing the concentration of at least one polymer from a polymer-containing waste material, and polymer recyclate", published on May 11, 2016.
English Translation—Machine Translation of WO03035729A2, "Recycling of waste expanded polystyrene foams to give products which may be re-expanded", published on May 1, 2003.
Fe et al., "Destruction of the flame retardant hexabromocyclododecane in a full-scale municipal solid waste incinerator", Waste Manag Res., Feb. 2015; 33(2): 165-74.
Feng et al., "Synthesis and Surface Properties of Polystyrene-graft-poly(ethylene glycol) Copolymers", Journal of Applied Polymer Science, vol. 103, 1458-1465 (2007).
Garcia et al., "Study of the solubility and stability of polystyrene wastes in a dissolution recycling process", Waste Management 29 (Feb. 2009) 1814-1818.
Gesner et al., "Phase Separation of Some Acrylonitrile-Butadiene-Styrene Resins", Journal of Polymer Science: Part A, vol. 3, pp. 3825-3831 (1965).
Gonzalez et al., "Waste expanded polystyrene recycling by cymene using liquid or super critical CO2 for solvent recovery", published on Apr. 23, 2018.
Gutierrez et al., "Determination of the high-pressure phase equilibria of Polystyrene/p-Cymene in presence of CO2", J. of Supercritical fluids 92 (Jun. 2014) 288-298.
Hadi et al., "Reconditioning process of waste low density polyethylene using new technique", Journal of Purity, Utility Reaction and Environment, vol. 1, No. 8, Oct. 2012, pp. 400-410.
Hattori et al., "Dissolution of polystyrene into p-cymene and related substances in tree leaf oils", Journal of wood science, 56(2): 169-171, 2010-10.
Kampouris et al., "A model recovery process for scrap polystyrene foam by means of solvent systems", Conservation & Recycling, vol. 10, No. 4, pp. 315-319, 1987.
Kampouris et al., "Solvent Recycling of Rigid Poly(Vinyl Chloride) Bottles", Journal of Vinyl Technology, Jun. 1986, vol. 8, No. 2.
Lau et al., "Precipitation studies of polystyrene from solution", Makromol. Chem. 185, 1219-1228 (Jun. 1984).
Leal et al., "Evolution of the morphology of HIPS particles", Polymer 50 (2009) 68-76.
Mark et al., "Destruction of the flame retardant hexabromocyclododecane in a full-scale municipal solid waste incinerator", Waste Management & Research 2015, vol. 33(2) 165-174, Feb. 3, 2015.
Meuwissen et al. "CreaSolv closing the PS Loop Contribution to the concept of Circular Economy", Nairobi, UNEP Basel OEWG side event, May 30, 2016.
Notice of Opposition dated Jun. 3, 2020, European Patent 3 201 246 (Application No. 15 845.1), Proprietor: Polystyvert Inc., Opponent: Kraus & Weisert.
Samper et al., "Recycling of Expanded Polystyrene from Packaging", Progress in Rubber, Plastics and Recycling Technology, vol. 26, No. 2, 2010.
Schlummer et al., "Characterisation of polymer fractions from waste electrical and electronic equipment (WEEE) and implications for waste management", Chemosphere 67 (2007) 1866-1876, Jan. 17, 2007.

(56) References Cited

OTHER PUBLICATIONS

Schlummer et al., "Recycling of Flame Retarded Waste Polystyrene Foams (EPS and XPS) to PS Granules Free of Hexabromocyclododecane (HBCDD)", Adv Recycling Waste Manag 2017, 2:2., May 15, 2017.
Schlummer et al., "Recycling of flame retarded waste polystyrene foams (EPS and XPS) to PS granules free of hexabromocyclododecane (HBCDD)", Fraunhofer IVV, Recycling Plastics, Germany. Based on http://www.creacycle.de/en/projects/recycling-of-expanded-polystyrene-eps/polystyrene-loop-2016.html, no date is provided for publication. However, Schlummer et al cites as reference #14 Mark et al. "Destruction of the flame retardant hexabromocyclododecane in a full-scale municipal solid waste incinerator", Waste Man Res. Feb. 2015;33(2):165-74.
Schlummer et al., "Report: Recycling of flame-retarded plastics from waste electric and electronic equipment (WEEE)", Waste Manage Res Jan. 2006: 24: 573-583.
Strobl et al., "Recycling Potential for Non-Valorized Plastic Fractions from Electrical and Electronic Waste", Recycling Apr. 2021, 6, 33.
Tan et al., "Precipitation of Polystyrene from Toluene with HFC-134a by the GAS Process", Ind. Eng. Chem. Res. (Apr. 9, 1998), 37, 1821-1826.
Technical Data Sheet of Styron 678E, retrieved from the internet on Jan. 31, 2022.
Toxicological Risks of Selected Flame-Retardant Chemicals, Subcommittee on Flame-Retardant Chemicals; Committee on Toxicology; Board on Environmental Studies and Toxicology; Commission on Life Sciences; National Research Council (2000).
Turner et al., "Determination of Ungrafted Rubber in ABS Polymers", J. of Elastomers and Plastics, vol. 6 (Apr. 1974), p. 94.
Arends, Dahmar et al. "Removal of inorganic colour pigments from acrylonitrile butadiene styrene by dissolution-based recycling". J Master Cycles Waste Manag (2012) 14:85-93.
English Translation—Machine Translation of DE10200502645A1. Published on Dec. 14, 2006.
English Translation—Machine Translation of EP894818. Published on Feb. 3, 1992.
English Translation—Machine Translation of JP2002-264129. Published on Sep. 18, 2002.

Rovere et al. "Role of the rubber particle and polybutadiene cis content on the toughness of high impact polysturene". J Master Sci (2008) 43:952-959.
Arostegui et al. Effect of Dissolution-Based Recycling on the Degradation and the Mechanical Properties of Acrylonitrileebutadieneestyrene Copolymer. Polymer Degradation and Stability 91 (2006) 2768-2774.
English Translation—Machine Translation of CN111257270. Published on Jun. 9, 2020.
English Translation—Machine Translation of JP 093239. Published on Jan. 7, 1997.
Schlummer et al. Recycling of Styrene Polymers from Shredded Screen Housings Containing Brominated Flame Retardants. Journal of Applied Polymer Science, vol. 102, 1262-1273 (2006).
Grause et al. A novel process for the removal of bromine from styrene polymers containing brominated flame retardant. Polymer Degradation and Stability 112 (2015) 86-93.
English Translation of JP2002224652A, published on Aug. 13, 2002 (machine translation).
English Translation of JP2007144829A, published on Jun. 14, 2007 (machine translation).
English Translation of JP2005162847A, published on Jun. 23, 2005 (machine translation).
English Translation of JP2008063511A, published on Mar. 21, 2008(machine translation).
English Translation of JP2015160900A, published on Sep. 7, 2015 (machine translation).
English Translation—Machine Translation of DE 4319180. Published on Jan. 13, 1994.
English Translation—Machine Translation of JP 2005162847. Published on Jun. 23, 2005.
English Translation—Machine Translation of EP 0 894 818 A1, "Process for recycling soluble polymers or polymer blends from plastic containing materials" published on Feb. 3, 1999.
English Translation—Machine Translation of JP2016010906 "Method for removing flame retardant from foamed polystyrene" published in Jan. 21, 2016.
English Translation of WO2003011956 (Abstract only). Published Feb. 13, 2003.

* cited by examiner

METHODS OF RECYCLING POLYSTYRENE MATERIAL COMPRISING BROMINATED CONTAMINANTS

CROSS-REFERENCE TO RELATED APPLICATION

This application is a 35 USC 371 national stage entry of PCT/CA2022/051666 filed on Nov. 11, 2022 and which claims priority to U.S. Provisional Application No. 63/278,482, filed Nov. 11, 2021, the contents of which are incorporated herein by reference in their entirety.

FIELD

The present disclosure relates to methods of recycling polystyrene waste comprising brominated contaminants including brominated polymeric flame retardants. The present disclosure also relates to methods of removing brominated contaminants from polystyrene waste.

INTRODUCTION

Post-consumer polystyrene waste is routinely recycled to obtain recycled polystyrene material that can be repurposed. Polystyrene waste such as expanded or extruded polystyrene (EPS or XPS) insulation often contains brominated flame retardants that are difficult to remove from the polystyrene waste, rendering the recycled polystyrene less desirable. For example, hexabromocyclododecane (HBCD) was commonly used as a flame retardant in polystyrene insulation until it was recently banned in Europe and other countries due to health hazard. HBCD's hydrophobic nature renders its removal from polystyrene difficult. Further, brominated polymeric flame retardant (PFR) comprising a brominated polybutadiene polystyrene copolymer presents a unique challenge in polystyrene recycling due to PFR's innate affinity to polystyrene polymer and polystyrene copolymers. Even for polystyrene waste that initially does not contain brominated contaminants; the removal problem persists since batches of polystyrene waste are often cross-contaminated due to handling during waste management, and/or during the recycling process.

At the same time, situations arise where it may be desirable to retain PFR in the recycled polystyrene for example when it is known that the recycled polystyrene will be reused for purposes requiring PFR, such as insulation material. Retaining PFR in such cases would present cost saving opportunities.

Therefore, there exists a need to develop methods of recycling polystyrene waste that allow the use to select for retention and removal of PFR.

SUMMARY

It has been shown that monocyclic aromatic (benzenic) solvents allowing for recycling of polystyrene waste through a dissolution/precipitation process have differential solubility for PFR. For example, solvents such as benzene substituted with one or two $C_1$ to $C_4$ alkyl substituents, where at least one of the substituents is isopropyl (e.g. cumene and p-cymene), and solvent mixtures comprising about 30 wt % of $C_6$ to $C_7$ hydrocarbon solvent and about 70 wt % of benzene or benzene substituted with one or two substituents each chosen from $C_1$ and $C_2$ alkyl (e.g. toluene, p-xylene, ethylbenzene, p-ethyltoluene), or about 70 wt % of benzene substituted with one or two $C_1$ to $C_4$ alkyl substituents cannot solubilize PFR. On the other hand, benzene, the benzenic solvents and solvent mixtures of benzene or benzenic solvents with about 5 wt % to about 55 wt % of a hydrocarbon polystyrene non-solvent remain suitable solvents for solubilizing polystyrene.

At the same time, the use of benzene, the benzenic solvents and solvent mixtures allow for removal of other impurities, additives, and/or fillers present in the polystyrene.

Accordingly, in one aspect, the present disclosure includes a method of removing a brominated polybutadiene polystyrene copolymer from a polystyrene waste comprising
   combining the polystyrene waste with a second solvent chosen from benzenes substituted with one to four, optionally one or two, substituents each chosen from $C_1$ to $C_4$ alkyl, wherein at least one of the one to four substituents is isopropyl, a solvent mixture comprising about 45 wt % to about 95 wt % of a first solvent or the second solvent and about 5 wt % to about 55 wt % of a hydrocarbon polystyrene non-solvent, and mixtures thereof, to obtain a polystyrene/second solvent mixture and a solid comprising the copolymer, the hydrocarbon polystyrene non-solvent being a $C_5$ to $C_8$ hydrocarbon; and
   separating the solid comprising the copolymer and the polystyrene/second solvent mixture,
wherein the first solvent is chosen from benzenes substituted with one or two substituents each chosen from $C_1$ and $C_2$ alkyl, and mixtures thereof.

In another aspect, the present disclosure includes a method of removing a brominated polybutadiene polystyrene copolymer from a polystyrene waste comprising
   combining the polystyrene waste with a second solvent chosen from benzenes substituted with one to four, optionally one or two, substituents each chosen from $C_1$ to $C_4$ alkyl, wherein at least one of the one to four substituents is isopropyl, a solvent mixture comprising about 45 wt % to about 95 wt % of benzene or a first solvent or the second solvent and about 5 wt % to about 55 wt % of a hydrocarbon polystyrene non-solvent, and mixtures thereof, to obtain a polystyrene/second solvent mixture and a solid comprising the copolymer, the hydrocarbon polystyrene non-solvent being a $C_5$ to $C_8$ hydrocarbon; and
   separating the solid comprising the copolymer and the polystyrene/second solvent mixture,
wherein the first solvent is chosen from benzenes substituted with one or two substituents each chosen from $C_1$ and $C_2$ alkyl, and mixtures thereof.

In another aspect, the present disclosure includes a method of recycling a polystyrene waste,
   the recycling comprising retention of a brominated polybutadiene polystyrene copolymer or removal of the copolymer
   when the recycling comprises retention of the copolymer, the method comprising
      dissolving the polystyrene waste in a first solvent, the first solvent being chosen from benzenes substituted with one or two substituents each chosen from $C_1$ and $C_2$ alkyl and mixtures thereof, to obtain a polystyrene/first solvent mixture,
      adding the polystyrene/first solvent mixture to a first portion of hydrocarbon polystyrene non-solvent at the boiling point of the hydrocarbon polystyrene non-solvent to obtain precipitated polystyrene and a first portion of hydrocarbon waste solution, the hydrocarbon polystyrene non-solvent being chosen from $C_5$ to $C_8$ hydrocarbon and mixtures thereof, separating the precipitated polystyrene from the first portion of hydrocarbon waste solution, optionally repeating the dissolving, adding and separating, washing the precipitated polystyrene with a second portion of hydrocarbon polystyrene non-solvent at the boiling point of the hydrocarbon polystyrene non-solvent to obtain washed polystyrene and a second portion of hydrocarbon waste solution, separating the washed polystyrene from the second portion of hydrocarbon waste solution, washing the washed polystyrene with a third portion of hydrocarbon polystyrene non-solvent at the boiling point of the hydrocarbon polystyrene non-solvent to obtain a twice washed polystyrene and a third portion of hydrocarbon waste solution, separating the twice washed polystyrene from the third portion of hydrocarbon waste solution, and optionally drying the twice washed polystyrene; and when the recycling comprises removal of the copolymer, the method comprising dissolving the polystyrene waste in a second solvent, the second solvent being chosen from benzenes substituted with one or two substituents each chosen from $C_1$ to $C_4$ alkyl, wherein at least one of the one or two substituents is isopropyl, a solvent mixture comprising about 45 wt % to about 95 wt % of a first solvent as defined above or the second solvent and about 5 wt % to about 55 wt % of a hydrocarbon polystyrene non-solvent as defined above, and mixtures thereof, to obtain a polystyrene/second solvent mixture and a solid comprising the copolymer, separating the solid comprising the copolymer from the polystyrene/second solvent mixture, adding the polystyrene/second solvent mixture to a first portion of hydrocarbon polystyrene nonsolvent at the boiling point of the hydrocarbon polystyrene non-solvent to obtain precipitated polystyrene and a first portion of hydrocarbon waste solution, separating the precipitated polystyrene from the first portion of hydrocarbon waste solution, optionally repeating the dissolving, adding and separating, washing the precipitated polystyrene with a second portion of hydrocarbon polystyrene non-solvent at the boiling point of the hydrocarbon polystyrene non-solvent to obtain washed polystyrene and a second portion of hydrocarbon waste solution, separating the washed polystyrene from the second portion of hydrocarbon waste solution, washing the washed polystyrene with a third portion of hydrocarbon polystyrene non-solvent at the boiling point of the hydrocarbon polystyrene non-solvent to obtain a twice washed polystyrene and a third portion of hydrocarbon waste solution, separating the twice washed polystyrene from the third portion of hydrocarbon waste solution, and optionally drying the twice washed polystyrene.

In another aspect, the present disclosure includes a method of recycling a polystyrene waste, the recycling comprising retention of a brominated polybutadiene polystyrene copolymer or removal of the copolymer when the recycling comprises retention of the copolymer, the method comprising dissolving the polystyrene waste in a first solvent, the first solvent being chosen from benzenes substituted with one or two substituents each chosen from $C_1$ and $C_2$ alkyl and mixtures thereof, to obtain a polystyrene/first solvent mixture, adding the polystyrene/first solvent mixture to a first portion of hydrocarbon polystyrene non-solvent at the boiling point of the hydrocarbon polystyrene non-solvent to obtain precipitated polystyrene and a first portion of hydrocarbon waste solution, the hydrocarbon polystyrene non-solvent being chosen from $C_5$ to $C_8$ hydrocarbon and mixtures thereof, separating the precipitated polystyrene from the first portion of hydrocarbon waste solution, optionally repeating the dissolving, adding and separating, washing the precipitated polystyrene with a second portion of hydrocarbon polystyrene non-solvent at the boiling point of the hydrocarbon polystyrene non-solvent to obtain washed polystyrene and a second portion of hydrocarbon waste solution, separating the washed polystyrene from the second portion of hydrocarbon waste solution, washing the washed polystyrene with a third portion of hydrocarbon polystyrene non-solvent at the boiling point of the hydrocarbon polystyrene non-solvent to obtain a twice washed polystyrene and a third portion of hydrocarbon waste solution, separating the twice washed polystyrene from the third portion of hydrocarbon waste solution, and optionally drying the twice washed polystyrene; and when the recycling comprises removal of the copolymer, the method comprising dissolving the polystyrene waste in a second solvent, the second solvent being chosen from benzenes substituted with one or two substituents each chosen from $C_1$ to $C_4$ alkyl, wherein at least one of the one or two substituents is isopropyl, a solvent mixture comprising about 45 wt % to about 95 wt % of a first solvent as defined above or the second solvent and about 5 wt % to about 55 wt % of a hydrocarbon polystyrene non-solvent as defined above, and mixtures thereof, to obtain a polystyrene/second solvent mixture and a solid comprising the copolymer, separating the solid comprising the copolymer from the polystyrene/second solvent mixture, combining the polystyrene/second solvent mixture with a first portion of hydrocarbon polystyrene nonsolvent at the boiling point of the hydrocarbon polystyrene non-solvent to obtain precipitated polystyrene and a first portion of hydrocarbon waste solution, separating the precipitated polystyrene from the first portion of hydrocarbon waste solution, optionally repeating the dissolving, adding and separating, washing the precipitated polystyrene
with a second portion of hydrocarbon polystyrene non-solvent at the boiling point of the hydrocarbon polystyrene non-solvent or with a second solvent mixture comprising about 45 wt % to about 95 wt % of the hydrocarbon polystyrene non-solvent and about 5 wt % to about 55 wt % of a first solvent as defined above or the second solvent, and mixtures thereof to obtain a washed polystyrene and a second portion of hydrocarbon waste solution, separating the washed polystyrene from the second portion of hydrocarbon waste solution, washing the washed polystyrene
- with a third portion of hydrocarbon polystyrene non-solvent at the boiling point of the hydrocarbon polystyrene non-solvent or
- with a third solvent mixture comprising about 45 wt % to about 95 wt % of the hydrocarbon polystyrene non-solvent and about 5 wt % to about 55 wt % of a first solvent as defined above or the second solvent, and mixtures thereof to obtain a twice washed polystyrene and a third portion of hydrocarbon waste solution, separating the twice washed polystyrene from the third portion of hydrocarbon waste solution, and drying the twice washed polystyrene.

In another aspect, the present disclosure includes a method of recovering carbonaceous additives from a polystyrene waste comprising dissolving the polystyrene waste in a second solvent, a solvent mixture comprising about 45 wt % to about 95 wt % of a first solvent or the second solvent and about 5 wt % to about 55 wt % of a hydrocarbon polystyrene non-solvent, and mixtures thereof, to obtain a polystyrene/second solvent mixture and a solid comprising the carbonaceous additives, separating the polystyrene/second solvent mixture and the solid comprising the carbonaceous additives, washing the solid comprising the carbonaceous additives with a first solvent to obtain the carbonaceous additives and a first solvent solution, and optionally drying the carbonaceous additives, the first solvent being chosen from benzenes substituted with one or two substituents each chosen from $C_1$ and $C_2$ alkyl and mixtures thereof, the second solvent being chosen from benzenes substituted with one or two substituents each chosen from $C_1$ to $C_4$ alkyl, wherein at least one of the one or two substituents is isopropyl, the hydrocarbon polystyrene non-solvent being chosen from $C_5$ to $C_8$ hydrocarbon and mixtures thereof.

In another aspect, the present disclosure includes a use of a second solvent in the removal of a brominated polybutadiene polystyrene copolymer, the second solvent being chosen from benzenes substituted with one or two substituents each chosen from $C_1$ to $C_4$ alkyl, wherein at least one of the one or two substituents is isopropyl, a solvent mixture comprising about 45 wt % to about 95 wt % of a first solvent or the second solvent and about 5 wt % to about 55 wt % of a hydrocarbon polystyrene non-solvent, and mixtures thereof, and the first solvent being chosen from benzenes substituted with one or two substituents each chosen from $C_1$ and $C_2$ alkyl, and mixtures thereof.

In another aspect, the present disclosure includes a use of a second solvent in the recovery of a brominated polybutadiene polystyrene copolymer.

the second solvent being chosen from benzenes substituted with one or two substituents each chosen from $C_1$ to $C_4$ alkyl, wherein at least one of the one or two substituents is isopropyl, a solvent mixture comprising about 45 wt % to about 95 wt % of a first solvent or the second solvent and about 5 wt % to about 55 wt % of a hydrocarbon polystyrene non-solvent, and mixtures thereof, and the first solvent being chosen from benzenes substituted with one or two substituents each chosen from $C_1$ and $C_2$ alkyl, and mixtures thereof.

In another aspect, the present disclosure includes a use of a brominated polybutadiene polystyrene copolymer recovered from a method of the present disclosure to in the manufacture of polystyrene product, optionally the polystyrene product is insulation.

In another aspect, the present disclosure includes a use of a carbonaceous additive recovered from a polystyrene waste by the method of the present disclosure in the manufacture of a polystyrene product, optionally the product is insulation.

In another aspect, the present disclosure includes a method of recycling a polystyrene waste, the recycling comprising retention of a brominated polybutadiene polystyrene copolymer or removal of the copolymer when the recycling comprises retention of the copolymer, the method comprising dissolving the polystyrene waste in a first solvent, the first solvent being chosen from benzenes substituted with one or two substituents each chosen from $C_1$ and $C_2$ alkyl and mixtures thereof, to obtain a polystyrene/first solvent mixture, adding the polystyrene/first solvent mixture to a first portion of hydrocarbon polystyrene non-solvent under conditions to obtain precipitated polystyrene and a first portion of hydrocarbon waste solution, the hydrocarbon polystyrene non-solvent being chosen from $C_5$ to $C_8$ hydrocarbon and mixtures thereof, separating the precipitated polystyrene from the first portion of hydrocarbon waste solution, optionally repeating the dissolving, adding and separating, washing the precipitated polystyrene with a second portion of hydrocarbon polystyrene non-solvent under conditions to obtain washed polystyrene and a second portion of hydrocarbon waste solution, separating the washed polystyrene from the second portion of hydrocarbon waste solution, washing the washed polystyrene with a third portion of hydrocarbon polystyrene non-solvent under conditions to obtain a twice washed polystyrene and a third portion of hydrocarbon waste solution, separating the twice washed polystyrene from the third portion of hydrocarbon waste solution, and optionally drying the twice washed polystyrene; and when the recycling comprises removal of the copolymer, the method comprising dissolving the polystyrene waste in a second solvent, the second solvent being chosen from benzenes substituted with one or two substituents each chosen from $C_1$ to $C_4$ alkyl, wherein at least one of the one or two substituents is isopropyl, a solvent mixture comprising about 45 wt % to about 95 wt % of a first solvent as defined above or the second solvent and about 5 wt % to about 55 wt % of a hydrocarbon polystyrene non-solvent as defined above, and mixtures thereof, to obtain a polystyrene/second solvent mixture and a solid comprising the copolymer, separating the solid comprising the copolymer from the polystyrene/second solvent mixture, adding the polystyrene/second solvent mixture to a first portion of hydrocarbon polystyrene nonsolvent under conditions to obtain precipitated polystyrene and a first portion of hydrocarbon waste solution, separating the precipitated polystyrene from the first portion of hydrocarbon waste solution, optionally repeating the dissolving, adding and separating, washing the precipitated polystyrene with a second portion of hydrocarbon polystyrene non-solvent under conditions to obtain washed polystyrene and a second portion of hydrocarbon waste solution, separating the washed polystyrene from the second portion of hydrocarbon waste solution, washing the washed polystyrene with a third portion of hydrocarbon polystyrene non-solvent under conditions to obtain a twice washed polystyrene and a third portion of hydrocarbon waste solution, separating the twice washed polystyrene from the third portion of hydrocarbon waste solution, and optionally drying the twice washed polystyrene.

In another aspect, the present disclosure includes a method of recycling a polystyrene waste, the recycling comprising retention of a brominated polybutadiene polystyrene copolymer or removal of the copolymer when the recycling comprises retention of the copolymer, the method comprising dissolving the polystyrene waste in benzene or a first solvent, the first solvent being chosen from benzenes substituted with one or two substituents each chosen from $C_1$ and $C_2$ alkyl and mixtures thereof, to obtain a polystyrene/first solvent mixture, adding the polystyrene/first solvent mixture to a first portion of hydrocarbon polystyrene non-solvent at the boiling point of the hydrocarbon polystyrene non-solvent to obtain precipitated polystyrene and a first portion of hydrocarbon waste solution, the hydrocarbon polystyrene non-solvent being chosen from $C_5$ to $C_8$ hydrocarbon and mixtures thereof, separating the precipitated polystyrene from the first portion of hydrocarbon waste solution, optionally repeating the dissolving, adding and separating, washing the precipitated polystyrene with a second portion of hydrocarbon polystyrene non-solvent at the boiling point of the hydrocarbon polystyrene non-solvent to obtain washed polystyrene and a second portion of hydrocarbon waste solution, separating the washed polystyrene from the second portion of hydrocarbon waste solution, washing the washed polystyrene with a third portion of hydrocarbon polystyrene non-solvent at the boiling point of the hydrocarbon polystyrene non-solvent to obtain a twice washed polystyrene and a third portion of hydrocarbon waste solution, separating the twice washed polystyrene from the third portion of hydrocarbon waste solution, and optionally drying the twice washed polystyrene; and when the recycling comprises removal of the copolymer, the method comprising dissolving the polystyrene waste in a second solvent, the second solvent being chosen from benzenes substituted with one or two substituents each chosen from $C_1$ to $C_4$ alkyl, wherein at least one of the one or two substituents is isopropyl, a solvent mixture comprising about 45 wt % to about 95 wt % of benzene or a first solvent as defined above or the second solvent and about 5 wt % to about 55 wt % of a hydrocarbon polystyrene non-solvent as defined above, and mixtures thereof, to obtain a polystyrene/second solvent mixture and a solid comprising the copolymer, separating the solid comprising the copolymer from the polystyrene/second solvent mixture, combining the polystyrene/second solvent mixture with a first portion of hydrocarbon polystyrene nonsolvent at the boiling point of the hydrocarbon polystyrene non-solvent to obtain precipitated polystyrene and a first portion of hydrocarbon waste solution, separating the precipitated polystyrene from the first portion of hydrocarbon waste solution, optionally repeating the dissolving, adding and separating, washing the precipitated polystyrene
with a second portion of hydrocarbon polystyrene non-solvent at the boiling point of the hydrocarbon polystyrene non-solvent or
with a second solvent mixture comprising about 45 wt % to about 95 wt % of the hydrocarbon polystyrene non-solvent and about 5 wt % to about 55 wt % of benzene or a first solvent as defined above or the second solvent, and mixtures thereof to obtain a washed polystyrene and a second portion of hydrocarbon waste solution, separating the washed polystyrene from the second portion of hydrocarbon waste solution, washing the washed polystyrene
with a third portion of hydrocarbon polystyrene non-solvent at the boiling point of the hydrocarbon polystyrene non-solvent or
with a third solvent mixture comprising about 45 wt % to about 95 wt % of the hydrocarbon polystyrene non-solvent and about 5 wt % to about 55 wt % of benzene or a first solvent as defined above or the second solvent, and mixtures thereof to obtain a twice washed polystyrene and a third portion of hydrocarbon waste solution, separating the twice washed polystyrene from the third portion of hydrocarbon waste solution, and drying the twice washed polystyrene.

In another aspect, the present disclosure includes a method of removing a brominated polybutadiene polystyrene copolymer from a polystyrene waste comprising combining the polystyrene waste with a second solvent chosen from benzenes substituted with one to four, optionally one or two, substituents each chosen from $C_1$ to $C_4$ alkyl, wherein at least one of the one to four substituents is isopropyl, a solvent mixture comprising about 45 wt % to about 95 wt % of benzene or a first solvent or the second solvent and about 5 wt % to about 55 wt % of a hydrocarbon polystyrene non-solvent, and mixtures thereof, to obtain a polystyrene/second solvent mixture and a solid comprising the copolymer, the hydrocarbon polystyrene non-solvent being a $C_5$ to $C_8$ hydrocarbon; and separating the solid comprising the copolymer and the polystyrene/second solvent mixture, wherein the first solvent is chosen from benzenes substituted with one or two substituents each chosen from $C_1$ and $C_2$ alkyl, and mixtures thereof.

DRAWINGS

The embodiments of the disclosure will now be described in greater detail with reference to the attached drawings in which:

FIG. 1 shows a graph of bromine content (ppm) of solutions of polystyrene waste in various benzenic solvents (p-xylene, p-cymene, toluene, ethylbenzene) at different centrifugation speed.

Figure 2A:
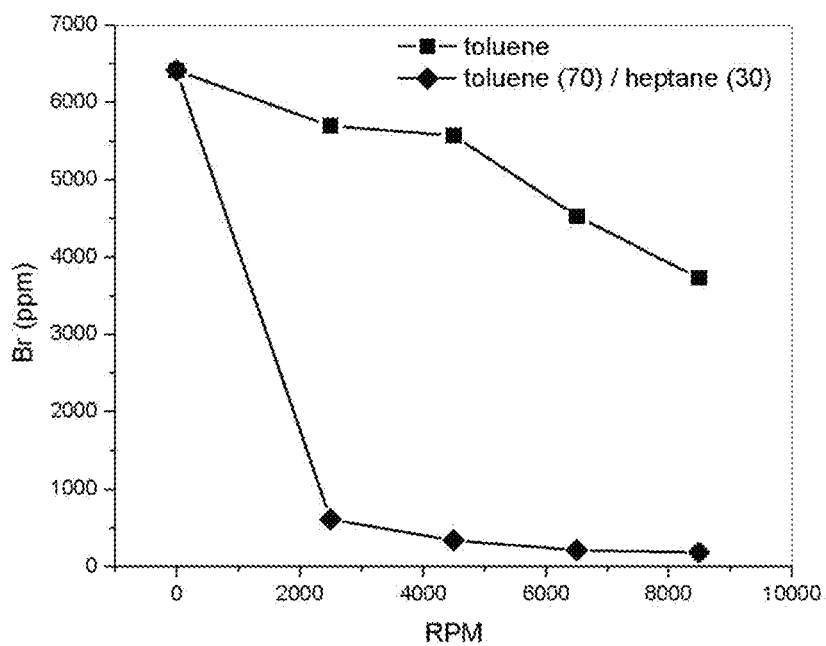
Figure 2B:
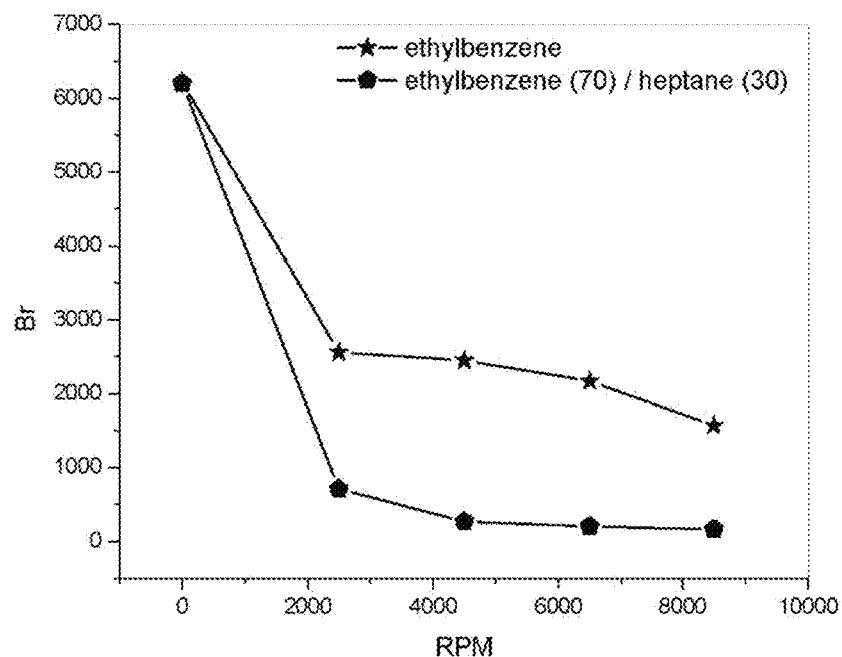
Figure 2C:
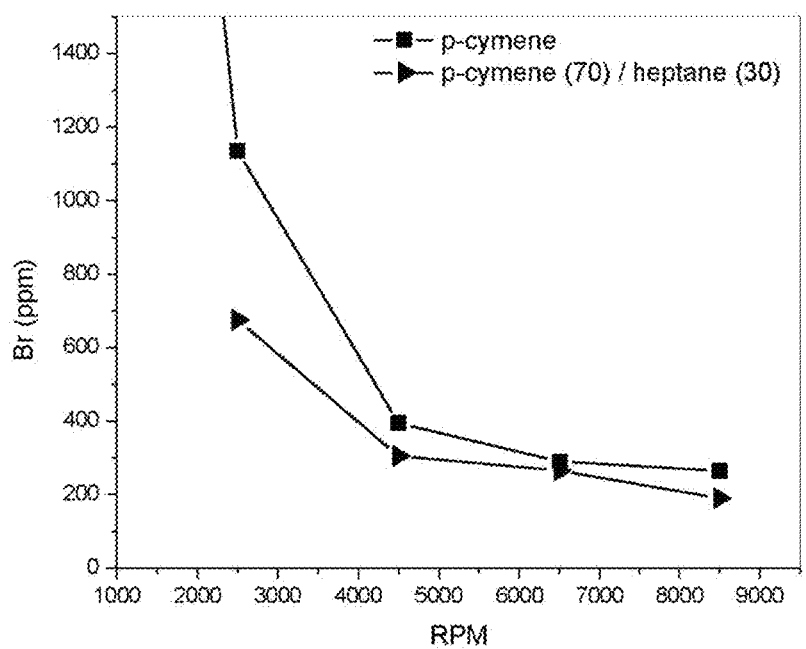
Figure 3:
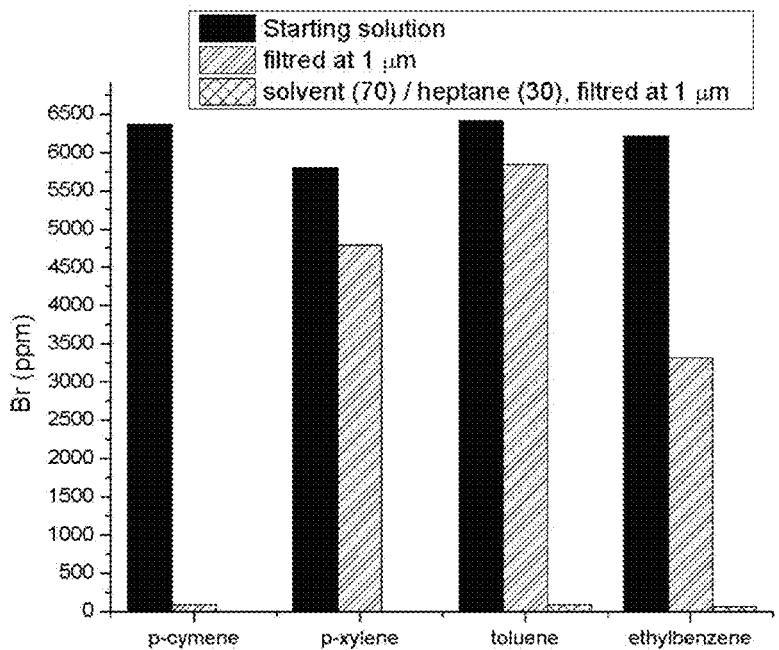

FIG. 2A shows a graph of bromine content (ppm) of solution of polystyrene waste in toluene and in 70 wt % toluene/30 wt % heptane, centrifuged at different centrifugation speed. FIG. 2B shows a graph of bromine content (ppm) of solution of polystyrene waste in toluene and in 70 wt % ethylbenzene/30 wt % heptane, centrifuged at different centrifugation speed. FIG. 2C shows a graph of bromine content (ppm) of solution of polystyrene waste in toluene and in 70 wt % p-cymene/30 wt % heptane, centrifuged at different centrifugation speed FIG. 3 shows a graph of bromine content (ppm) of a solution of polystyrene waste in p-cymene, p-xylene, toluene or ethylbenzene before and after filtration with 1 μm filter, and of a solution of polystyrene waste in 70 wt % p-cymene, p-xylene, toluene or ethylbenzene and 30 wt % heptane, filtered with 1 μm filter.

Figure 4:
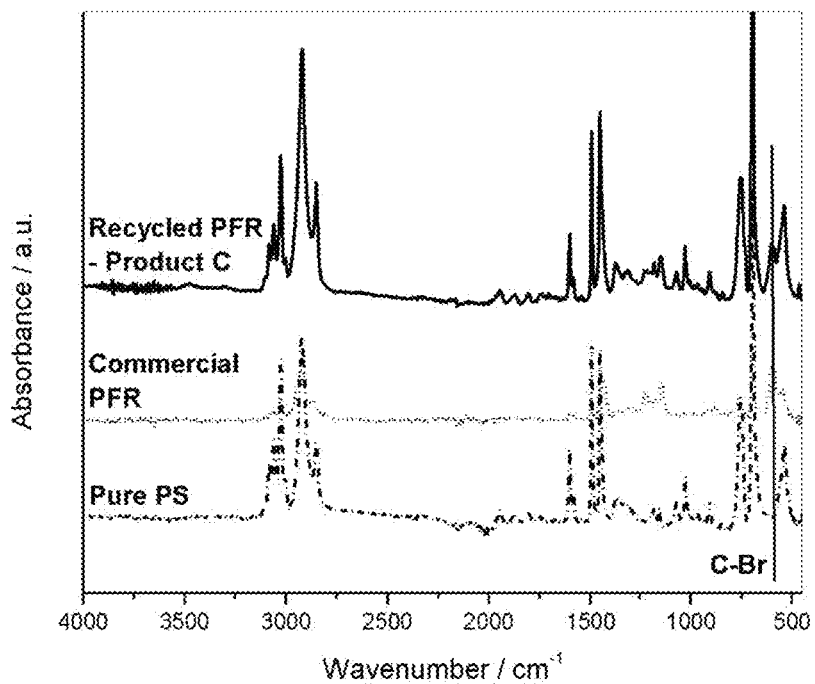

FIG. 4 shows the IR spectrum of commercial PFR, recovered Product C of Example 8, and pure polystyrene.

Other features and advantages of the present disclosure will become apparent from the following detailed description. It should be understood, however, that the detailed description and the specific examples, while indicating embodiments of the disclosure, are given by way of illustration only and the scope of the claims should not be limited by these embodiments, but should be given the broadest interpretation consistent with the description as a whole.

DESCRIPTION OF VARIOUS EMBODIMENTS

I. Definitions

Unless otherwise indicated, the definitions and embodiments described in this and other sections are intended to be applicable to all embodiments and aspects of the present disclosure herein described for which they are suitable as would be understood by a person skilled in the art.

The term "and/or" as used herein means that the listed items are present, or used, individually or in combination. In effect, this term means that "at least one of" or "one or more" of the listed items is used or present.

As used in the present disclosure, the singular forms "a", "an" and "the" include plural references unless the content clearly dictates otherwise. For example, an embodiment including "a compound" should be understood to present certain aspects with one compound, or two or more additional compounds.

In embodiments comprising an "additional" or "second" component, such as an additional or second solvent, the second component as used herein is chemically different from the other components or first component. A "third" component is different from the other, first, and second components, and further enumerated or "additional" components are similarly different.

As used in this disclosure and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

The term "consisting" and its derivatives as used herein are intended to be closed terms that specify the presence of the stated features, elements, components, groups, integers, and/or steps, and also exclude the presence of other unstated features, elements, components, groups, integers and/or steps.

The term "consisting essentially of", as used herein, is intended to specify the presence of the stated features, elements, components, groups, integers, and/or steps as well as those that do not materially affect the basic and novel characteristic(s) of these features, elements, components, groups, integers, and/or steps.

The present description refers to a number of chemical terms and abbreviations used by those skilled in the art. Nevertheless, definitions of selected terms are provided for clarity and consistency.

The terms "about", "substantially" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies or unless the context suggests otherwise to a person skilled in the art.

The term "alkyl" as used herein, whether it is used alone or as part of another group, means straight or branched chain, saturated alkyl groups. The number of carbon atoms that are possible in the referenced alkyl group are indicated by the prefix "$C_{n1-n2}$". For example, the term $C_{1-10}$alkyl means an alkyl group having 1, 2, 3, 4, 5, 6, 7, 8, 9 or 10 carbon atoms.

The term "polymeric flame retardant" or "PFR" or the like as used herein refers to a brominated polybutadiene polystyrene copolymer. For example, the copolymer can be a brominated polybutadiene polystyrene block copolymer of Formula I

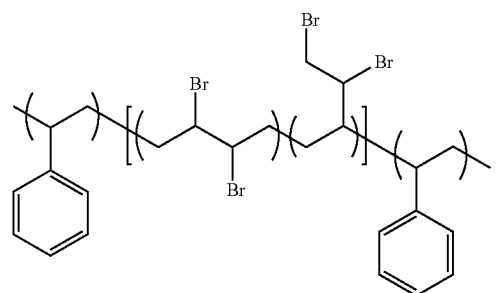

In some instances, the molecular weight of the copolymer of Formula I is about 50 kDa to about 200 kDa, or about 100 kDa. In some embodiments, the copolymer of Formula I comprises about 35 wt % to about 80 wt %, or about 65 wt % of bromine. An example of the copolymer of Formula I is FR-122P from ICL (CAS 1195978-93-8).

The term "additive" as used herein refers to chemicals added to a polymer to modify at least one physical, biological and/or chemical property. Non-limitative examples of additives are: coloring agents, fillers, flame retardants, lubricants and plasticizers.

The term "hydrocarbon polystyrene non-solvent" as used herein refers, for example, to a hydrocarbon-based compound or a mixture thereof in which polystyrene and PFR are substantially insoluble. The selection of a suitable hydrocarbon polystyrene non-solvent for the processes of the present disclosure can be made by a person skilled in the art.

For example, it will be appreciated by a person skilled in the art that most non-polar additives typically found in polystyrene waste (e.g. hexabromocyclododecane and silicone oils) and benzenic solvents should be substantially soluble in the hydrocarbon polystyrene non-solvent under the conditions used in the methods of the present disclosure to obtain precipitated polystyrene as well as steps which comprise washing with the hydrocarbon polystyrene non-solvent. It will also be appreciated by a person skilled in the art that it may, for example, be useful to select a hydrocarbon polystyrene non-solvent having a boiling point that is around or slightly above the glass transition temperature (Tg) of the polystyrene waste being recycled. Alternatively, pressure could be used during the method of the present disclosure for example during precipitation and washing to increase the boiling point of the hydrocarbon polystyrene non-solvent.

The term "benzenic solvent" or the like as used herein refers to a monocyclic aromatic solvent where the benzene is substituted one or more times with an alkyl substituent, each substituent chosen from $C_{1-4}$ alkyl.

The term "carbonaceous additives" or the like as used herein refers to carbon-based materials added to polystyrene products.

II. Methods of the Present Disclosure

In one aspect, the present disclosure includes a method of removing a brominated polybutadiene polystyrene copolymer from a polystyrene waste comprising
  combining the polystyrene waste with a second solvent chosen from benzenes substituted with one to four, optionally one or two, substituents each chosen from $C_1$ to $C_4$ alkyl, wherein at least one of the one to four substituents is isopropyl, a solvent mixture comprising about 45 wt % to about 95 wt % of a first solvent or the second solvent and about 5 wt % to about 55 wt % of a hydrocarbon polystyrene non-solvent, and mixtures thereof, to obtain a polystyrene/second solvent mixture and a solid comprising the copolymer, the hydrocarbon polystyrene non-solvent being a $C_5$ to $C_8$ hydrocarbon; and
  separating the solid comprising the copolymer and the polystyrene/second solvent mixture,
wherein the first solvent is chosen from benzenes substituted with one or two substituents each chosen from $C_1$ and $C_2$ alkyl, and mixtures thereof.

In another aspect, the present disclosure includes a method of removing a brominated polybutadiene polystyrene copolymer from a polystyrene waste comprising
  combining the polystyrene waste with a second solvent chosen from benzenes substituted with one to four, optionally one or two, substituents each chosen from $C_1$ to $C_4$ alkyl, wherein at least one of the one to four substituents is isopropyl, a solvent mixture comprising about 45 wt % to about 95 wt % of benzene or a first solvent or the second solvent and about 5 wt % to about 55 wt % of a hydrocarbon polystyrene non-solvent, and mixtures thereof, to obtain a polystyrene/second solvent mixture and a solid comprising the copolymer, the hydrocarbon polystyrene non-solvent being a $C_5$ to $C_8$ hydrocarbon; and
  separating the solid comprising the copolymer and the polystyrene/second solvent mixture,
wherein the first solvent is chosen from benzenes substituted with one or two substituents each chosen from $C_1$ and $C_2$ alkyl, and mixtures thereof.

In another aspect, the present disclosure includes a method of recycling a polystyrene waste,
  the recycling comprising retention of a brominated polybutadiene polystyrene copolymer or removal of the copolymer
  when the recycling comprises retention of the copolymer, the method comprising
    dissolving the polystyrene waste in a first solvent, the first solvent being chosen from benzenes substituted with one or two substituents each chosen from $C_1$ and $C_2$ alkyl and mixtures thereof, to obtain a polystyrene/first solvent mixture,
    adding the polystyrene/first solvent mixture to a first portion of hydrocarbon polystyrene non-solvent at the boiling point of the hydrocarbon polystyrene non-solvent to obtain precipitated polystyrene and a first portion of hydrocarbon waste solution, the hydrocarbon polystyrene non-solvent being chosen from $C_5$ to $C_8$ hydrocarbon and mixtures thereof,
    separating the precipitated polystyrene from the first portion of hydrocarbon waste solution, optionally repeating the dissolving, adding and separating,
    washing the precipitated polystyrene with a second portion of hydrocarbon polystyrene non-solvent at the boiling point of the hydrocarbon polystyrene non-solvent to obtain washed polystyrene and a second portion of hydrocarbon waste solution,
    separating the washed polystyrene from the second portion of hydrocarbon waste solution,
    washing the washed polystyrene with a third portion of hydrocarbon polystyrene non-solvent at the boiling point of the hydrocarbon polystyrene non-solvent to obtain a twice washed polystyrene and a third portion of hydrocarbon waste solution,
    separating the twice washed polystyrene from the third portion of hydrocarbon waste solution, and
    optionally drying the twice washed polystyrene; and
  when the recycling comprises removal of the copolymer, the method comprising
    dissolving the polystyrene waste in a second solvent, the second solvent being chosen from benzenes substituted with one or two substituents each chosen from $C_1$ to $C_4$ alkyl, wherein at least one of the one or two substituents is isopropyl, a solvent mixture comprising about 45 wt % to about 95 wt % of a first solvent as defined above or the second solvent and about 5 wt % to about 55 wt % of a hydrocarbon polystyrene non-solvent as defined above, and mixtures thereof, to obtain a polystyrene/second solvent mixture and a solid comprising the copolymer,
    separating the solid comprising the copolymer from the polystyrene/second solvent mixture,
    combining the polystyrene/second solvent mixture with a first portion of hydrocarbon polystyrene nonsolvent at the boiling point of the hydrocarbon polystyrene non-solvent to obtain precipitated polystyrene and a first portion of hydrocarbon waste solution,
    separating the precipitated polystyrene from the first portion of hydrocarbon waste solution, optionally repeating the dissolving, adding and separating,
    washing the precipitated polystyrene
      with a second portion of hydrocarbon polystyrene non-solvent at the boiling point of the hydrocarbon polystyrene non-solvent or
      with a second solvent mixture comprising about 45 wt % to about 95 wt % of the hydrocarbon polystyrene non-solvent and about 5 wt % to about 55 wt % of a first solvent as defined above or the second solvent, and mixtures thereof to obtain a washed polystyrene and a second portion of hydrocarbon waste solution, separating the washed polystyrene from the second portion of hydrocarbon waste solution, washing the washed polystyrene
with a third portion of hydrocarbon polystyrene non-solvent at the boiling point of the hydrocarbon polystyrene non-solvent or
with a third solvent mixture comprising about 45 wt % to about 95 wt % of the hydrocarbon polystyrene non-solvent and about 5 wt % to about 55 wt % of a first solvent as defined above or the second solvent, and mixtures thereof to obtain a twice washed polystyrene and a third portion of hydrocarbon waste solution, separating the twice washed polystyrene from the third portion of hydrocarbon waste solution, and drying the twice washed polystyrene.

In another aspect, the present disclosure includes a method of recovering carbonaceous additives from a polystyrene waste comprising dissolving the polystyrene waste in a second solvent, a solvent mixture comprising about 45 wt % to about 95 wt % of a first solvent or the second solvent and about 5 wt % to about 55 wt % of a hydrocarbon polystyrene non-solvent, and mixtures thereof, to obtain a polystyrene/second solvent mixture and a solid comprising the carbonaceous additives, separating the polystyrene/second solvent mixture and the solid comprising the carbonaceous additives, washing the solid comprising the carbonaceous additives with a first solvent to obtain the carbonaceous additives and a first solvent solution, and optionally drying the carbonaceous additives, the first solvent being chosen from benzenes substituted with one or two substituents each chosen from $C_1$ and $C_2$ alkyl and mixtures thereof, the second solvent being chosen from benzenes substituted with one or two substituents each chosen from $C_1$ to $C_4$ alkyl, wherein at least one of the one or two substituents is isopropyl, the hydrocarbon polystyrene non-solvent being chosen from $C_5$ to $C_8$ hydrocarbon and mixtures thereof.

In another aspect, the present disclosure includes a method of recycling a polystyrene waste, the recycling comprising retention of a brominated polybutadiene polystyrene copolymer or removal of the copolymer when the recycling comprises retention of the copolymer, the method comprising dissolving the polystyrene waste in a first solvent, the first solvent being chosen from benzenes substituted with one or two substituents each chosen from $C_1$ and $C_2$ alkyl and mixtures thereof, to obtain a polystyrene/first solvent mixture, adding the polystyrene/first solvent mixture to a first portion of hydrocarbon polystyrene non-solvent at the boiling point of the hydrocarbon polystyrene non-solvent to obtain precipitated polystyrene and a first portion of hydrocarbon waste solution, the hydrocarbon polystyrene non-solvent being chosen from $C_5$ to $C_8$ hydrocarbon and mixtures thereof, separating the precipitated polystyrene from the first portion of hydrocarbon waste solution, optionally repeating the dissolving, adding and separating, washing the precipitated polystyrene with a second portion of hydrocarbon polystyrene non-solvent at the boiling point of the hydrocarbon polystyrene non-solvent to obtain washed polystyrene and a second portion of hydrocarbon waste solution, separating the washed polystyrene from the second portion of hydrocarbon waste solution, washing the washed polystyrene with a third portion of hydrocarbon polystyrene non-solvent at the boiling point of the hydrocarbon polystyrene non-solvent to obtain a twice washed polystyrene and a third portion of hydrocarbon waste solution, separating the twice washed polystyrene from the third portion of hydrocarbon waste solution, and optionally drying the twice washed polystyrene; and when the recycling comprises removal of the copolymer, the method comprising dissolving the polystyrene waste in a second solvent, the second solvent being chosen from benzenes substituted with one or two substituents each chosen from $C_1$ to $C_4$ alkyl, wherein at least one of the one or two substituents is isopropyl, a solvent mixture comprising about 45 wt % to about 95 wt % of a first solvent as defined above or the second solvent and about 5 wt % to about 55 wt % of a hydrocarbon polystyrene non-solvent as defined above, and mixtures thereof, to obtain a polystyrene/second solvent mixture and a solid comprising the copolymer, separating the solid comprising the copolymer from the polystyrene/second solvent mixture, adding the polystyrene/second solvent mixture to a first portion of hydrocarbon polystyrene nonsolvent at the boiling point of the hydrocarbon polystyrene non-solvent to obtain precipitated polystyrene and a first portion of hydrocarbon waste solution, separating the precipitated polystyrene from the first portion of hydrocarbon waste solution, optionally repeating the dissolving, adding and separating, washing the precipitated polystyrene with a second portion of hydrocarbon polystyrene non-solvent at the boiling point of the hydrocarbon polystyrene non-solvent to obtain washed polystyrene and a second portion of hydrocarbon waste solution, separating the washed polystyrene from the second portion of hydrocarbon waste solution, washing the washed polystyrene with a third portion of hydrocarbon polystyrene non-solvent at the boiling point of the hydrocarbon polystyrene non-solvent to obtain a twice washed polystyrene and a third portion of hydrocarbon waste solution, separating the twice washed polystyrene from the third portion of hydrocarbon waste solution, and optionally drying the twice washed polystyrene.

In another aspect, the present disclosure includes a use of a second solvent in the removal of a brominated polybutadiene polystyrene copolymer, the second solvent being chosen from benzenes substituted with one or two substituents each chosen from $C_1$ to $C_4$ alkyl, wherein at least one of the one or two substituents is isopropyl, a solvent mixture comprising about 45 wt % to about 95 wt % of a first solvent or the second solvent and about 5 wt % to about 55 wt % of a hydrocarbon polystyrene non-solvent, and mixtures thereof, and the first solvent being chosen from benzenes substituted with one or two substituents each chosen from $C_1$ and $C_2$ alkyl, and mixtures thereof.

In another aspect, the present disclosure includes a use of a second solvent in the recovery of a brominated polybutadiene polystyrene copolymer.

the second solvent being chosen from benzenes substituted with one or two substituents each chosen from $C_1$ to $C_4$ alkyl, wherein at least one of the one or two substituents is isopropyl, a solvent mixture comprising about 45 wt % to about 95 wt % of a first solvent or the second solvent and about 5 wt % to about 55 wt % of a hydrocarbon polystyrene non-solvent, and mixtures thereof, and the first solvent being chosen from benzenes substituted with one or two substituents each chosen from $C_1$ and $C_2$ alkyl, and mixtures thereof.

In another aspect, the present disclosure includes a use of a brominated polybutadiene polystyrene copolymer recovered from a method of the present disclosure to in the manufacture of polystyrene product, optionally the polystyrene product is insulation.

In another aspect, the present disclosure includes a use of a carbonaceous additive recovered from a polystyrene waste by the method of the present disclosure in the manufacture of a polystyrene product, optionally the product is insulation.

It can be appreciated that the recovered brominated polybutadiene polystyrene copolymer and the recovered carbonaceous additives of the present disclosure can contain small amounts of residual polystyrene. The small amounts of residual polystyrene does not affect the use of the recovered brominated polybutadiene polystyrene copolymer or the recovered carbonaceous additives in the manufacture of polystyrene products since the polystyrene products would already contain polystyrene.

In another aspect, the present disclosure includes a method of recycling a polystyrene waste, the recycling comprising retention of a brominated polybutadiene polystyrene copolymer or removal of the copolymer when the recycling comprises retention of the copolymer, the method comprising dissolving the polystyrene waste in a first solvent, the first solvent being chosen from benzenes substituted with one or two substituents each chosen from $C_1$ and $C_2$ alkyl and mixtures thereof, to obtain a polystyrene/first solvent mixture, adding the polystyrene/first solvent mixture to a first portion of hydrocarbon polystyrene non-solvent under conditions to obtain precipitated polystyrene and a first portion of hydrocarbon waste solution, the hydrocarbon polystyrene non-solvent being chosen from $C_5$ to $C_8$ hydrocarbon and mixtures thereof, separating the precipitated polystyrene from the first portion of hydrocarbon waste solution, optionally repeating the dissolving, adding and separating, washing the precipitated polystyrene with a second portion of hydrocarbon polystyrene non-solvent under conditions to obtain washed polystyrene and a second portion of hydrocarbon waste solution, separating the washed polystyrene from the second portion of hydrocarbon waste solution, washing the washed polystyrene with a third portion of hydrocarbon polystyrene non-solvent under conditions to obtain a twice washed polystyrene and a third portion of hydrocarbon waste solution, separating the twice washed polystyrene from the third portion of hydrocarbon waste solution, and optionally drying the twice washed polystyrene; and when the recycling comprises removal of the copolymer, the method comprising dissolving the polystyrene waste in a second solvent, the second solvent being chosen from benzenes substituted with one or two substituents each chosen from $C_1$ to $C_4$ alkyl, wherein at least one of the one or two substituents is isopropyl, a solvent mixture comprising about 45 wt % to about 95 wt % of a first solvent as defined above or the second solvent and about 5 wt % to about 55 wt % of a hydrocarbon polystyrene non-solvent as defined above, and mixtures thereof, to obtain a polystyrene/second solvent mixture and a solid comprising the copolymer, separating the solid comprising the copolymer from the polystyrene/second solvent mixture, adding the polystyrene/second solvent mixture to a first portion of hydrocarbon polystyrene nonsolvent under conditions to obtain precipitated polystyrene and a first portion of hydrocarbon waste solution, separating the precipitated polystyrene from the first portion of hydrocarbon waste solution, optionally repeating the dissolving, adding and separating, washing the precipitated polystyrene with a second portion of hydrocarbon polystyrene non-solvent under conditions to obtain washed polystyrene and a second portion of hydrocarbon waste solution, separating the washed polystyrene from the second portion of hydrocarbon waste solution, washing the washed polystyrene with a third portion of hydrocarbon polystyrene non-solvent under conditions to obtain a twice washed polystyrene and a third portion of hydrocarbon waste solution, separating the twice washed polystyrene from the third portion of hydrocarbon waste solution, and optionally drying the twice washed polystyrene.

In another aspect, the present disclosure includes a method of recycling a polystyrene waste, the recycling comprising retention of a brominated polybutadiene polystyrene copolymer or removal of the copolymer when the recycling comprises retention of the copolymer, the method comprising dissolving the polystyrene waste in benzene or a first solvent, the first solvent being chosen from benzenes substituted with one or two substituents each chosen from $C_1$ and $C_2$ alkyl and mixtures thereof, to obtain a polystyrene/first solvent mixture, adding the polystyrene/first solvent mixture to a first portion of hydrocarbon polystyrene non-solvent at the boiling point of the hydrocarbon polystyrene non-solvent to obtain precipitated polystyrene and a first portion of hydrocarbon waste solution, the hydrocarbon polystyrene non-solvent being chosen from $C_5$ to $C_8$ hydrocarbon and mixtures thereof, separating the precipitated polystyrene from the first portion of hydrocarbon waste solution, optionally repeating the dissolving, adding and separating, washing the precipitated polystyrene with a second portion of hydrocarbon polystyrene non-solvent at the boiling point of the hydrocarbon polystyrene non-solvent to obtain washed polystyrene and a second portion of hydrocarbon waste solution, separating the washed polystyrene from the second portion of hydrocarbon waste solution, washing the washed polystyrene with a third portion of hydrocarbon polystyrene non-solvent at the boiling point of the hydrocarbon polystyrene non-solvent to obtain a twice washed polystyrene and a third portion of hydrocarbon waste solution, separating the twice washed polystyrene from the third portion of hydrocarbon waste solution, and optionally drying the twice washed polystyrene; and when the recycling comprises removal of the copolymer, the method comprising dissolving the polystyrene waste in a second solvent, the second solvent being chosen from benzenes substituted with one or two substituents each chosen from $C_1$ to $C_4$ alkyl, wherein at least one of the one or two substituents is isopropyl, a solvent mixture comprising about 45 wt % to about 95 wt % of benzene or a first solvent as defined above or the second solvent and about 5 wt % to about 55 wt % of a hydrocarbon polystyrene non-solvent as defined above, and mixtures thereof, to obtain a polystyrene/second solvent mixture and a solid comprising the copolymer, separating the solid comprising the copolymer from the polystyrene/second solvent mixture, combining the polystyrene/second solvent mixture with a first portion of hydrocarbon polystyrene nonsolvent at the boiling point of the hydrocarbon polystyrene non-solvent to obtain precipitated polystyrene and a first portion of hydrocarbon waste solution, separating the precipitated polystyrene from the first portion of hydrocarbon waste solution, optionally repeating the dissolving, adding and separating, washing the precipitated polystyrene
  with a second portion of hydrocarbon polystyrene non-solvent at the boiling point of the hydrocarbon polystyrene non-solvent or
  with a second solvent mixture comprising about 45 wt % to about 95 wt % of the hydrocarbon polystyrene non-solvent and about 5 wt % to about 55 wt % of benzene or a first solvent as defined above or the second solvent, and mixtures thereof to obtain a washed polystyrene and a second portion of hydrocarbon waste solution, separating the washed polystyrene from the second portion of hydrocarbon waste solution, washing the washed polystyrene
  with a third portion of hydrocarbon polystyrene non-solvent at the boiling point of the hydrocarbon polystyrene non-solvent or
  with a third solvent mixture comprising about 45 wt % to about 95 wt % of the hydrocarbon polystyrene non-solvent and about 5 wt % to about 55 wt % of benzene or a first solvent as defined above or the second solvent, and mixtures thereof to obtain a twice washed polystyrene and a third portion of hydrocarbon waste solution, separating the twice washed polystyrene from the third portion of hydrocarbon waste solution, and drying the twice washed polystyrene.

In another aspect, the present disclosure includes a method of removing a brominated polybutadiene polystyrene copolymer from a polystyrene waste comprising combining the polystyrene waste with a second solvent chosen from benzenes substituted with one to four, optionally one or two, substituents each chosen from $C_1$ to $C_4$ alkyl, wherein at least one of the one to four substituents is isopropyl, a solvent mixture comprising about 45 wt % to about 95 wt % of benzene or a first solvent or the second solvent and about 5 wt % to about 55 wt % of a hydrocarbon polystyrene non-solvent, and mixtures thereof, to obtain a polystyrene/second solvent mixture and a solid comprising the copolymer, the hydrocarbon polystyrene non-solvent being a $C_5$ to $C_8$ hydrocarbon; and separating the solid comprising the copolymer and the polystyrene/second solvent mixture, wherein the first solvent is chosen from benzenes substituted with one or two substituents each chosen from $C_1$ and $C_2$ alkyl, and mixtures thereof.

In some embodiments, the polystyrene waste further comprises carbonaceous additives and the solid comprising the copolymer further comprises the carbonaceous additives.

In some embodiments, the carbonaceous additives are one or more of graphite, graphene, carbon black, coke, char, tar, biochar, products and modified products of pyrolysis process.

In some embodiments, the method of removing a brominated polybutadiene polystyrene copolymer from a polystyrene waste of the present disclosure further comprises recovering the carbonaceous additives from the solid comprising the copolymer by dispersing the solid comprising the copolymer in a first solvent as defined herein to obtain a first solvent/copolymer solution comprising the copolymer and a solid residue comprising the carbonaceous additives.

In some embodiments, the washing of the precipitated polystyrene is with a continuous stream of the second portion of hydrocarbon polystyrene non-solvent or the second solvent mixture.

In some embodiments, the washing of the washed polystyrene is with a continuous stream of the third portion of hydrocarbon polystyrene non-solvent or the third solvent mixture.

In some embodiments, the removal of the brominated polybutadiene polystyrene copolymer is a selective removal. For instance, the removal of the brominated polybutadiene polystyrene copolymer is selective over the removal of other brominated flame retardants such as HBCD.

In some embodiments, the conditions comprise performing the washing and/or adding at the boiling point of the hydrocarbon polystyrene non-solvent.

In some embodiments, the separating of the solid comprising the copolymer is performed by filtration, centrifugation, decantation, sedimentation, or combinations thereof.

In some embodiments, the filtration is performed with a filter of about 0.25 µm to about 1000 µm, about 0.25 µm to about 800 µm, about 0.25 µm to about 600 µm, about 0.25 µm to about 400 µm, about 0.25 µm to about 200 µm, about 0.25 µm to about 100 µm, about 0.25 µm to about 50 µm, about 0.25 µm to about 30 µm, about 0.25 µm to about 20 µm, about 0.25 µm to about 10 µm, about 0.25 µm to about 5 µm, about 0.25 to about 3 µm, about 0.5 µm to about 2 µm, about 0.5 µm to about 1.5 µm, or about 1 µm.

In some embodiments, the centrifugation is performed at about 1500 rpm or more than 1500 rpm, about 1500 rpm to about 10000 rpm, about 2000 rpm to about 9500 rpm, about 3000 rpm to about 9500 rpm. In some embodiments, the centrifugation is performed about 4000 rpm to about 9500 rpm, or about 4000 rpm or more than 4000 rpm.

In some embodiments, the centrifugation is performed at about 600 RCF to about 10000 RCF, about 600 RCF to about 9000 RCF, about 700 RCF to about 8900 RCF, about 1000 RCF to about 7000 RCF, about 1000 RCF to about 5000 RCF, about 1000 RCF to about 3000 RCF, or about 1500 RCF to about 2700 RCF.

In some embodiments, the centrifugation is performed for about 5 seconds to about 20 min, about 3 min to about 10 min, about 5 sec to about 5 min, about 10 sec to about 10 min, about 10 sec to about 5 min, about 5 min to about 15 min, or about 10 sec to about 2 min.

In some embodiments, the first solvent is chosen from toluene, ethylbenzene, p-xylene, p-ethyltoluene, and mixtures thereof. In some embodiments, the first solvent is toluene, ethylbenzene, or mixtures thereof.

In some embodiments, benzene can be used in the place of the first solvent.

In some embodiments, the hydrocarbon polystyrene non-solvent is chosen from $C_6$ to $C_8$ alkanes and mixtures thereof.

In some embodiments, the hydrocarbon polystyrene non-solvent is chosen from $C_6$ to $C_7$ alkanes, and mixtures thereof.

In some embodiments, the hydrocarbon polystyrene non-solvent is n-pentane, pentanes, hexanes, n-hexane, heptanes, or n-heptane.

In some embodiments, the second solvent is chosen from cumene, p-cymene, the solvent mixture, and mixtures thereof.

In some embodiments, the solvent mixture comprises about 50 wt % to about 90 wt % of the first solvent and about 10 wt % to about 50 wt % of the hydrocarbon polystyrene non-solvent.

In some embodiments, the solvent mixture comprises about 60 wt % to about 80 wt % of the first solvent and about 20 wt % to about 40 wt % of the hydrocarbon polystyrene non-solvent.

In some embodiments, the solvent mixture comprises about 65 wt % to about 75 wt % of the first solvent and about 25 wt % to about 35 wt % of the hydrocarbon polystyrene non-solvent.

In some embodiments, the solvent mixture comprises about 70 wt % of the first solvent and about 30 wt % of the hydrocarbon polystyrene non-solvent.

In some embodiments, the second solvent is p-cymene.

In some embodiments, the second solvent is about 70 wt % toluene/about 30 wt % n-heptane, about 70 wt % ethylbenzene/about 30 wt % n-heptane, about 70 wt % toluene/about 30 wt % n-hexane.

In some embodiments, the dissolving, adding and washing are each performed with agitation, optionally by a mechanical stirrer.

In some embodiments, the method of the present disclosure further comprises recovering the removed copolymer In some embodiments, the brominated polybutadiene polystyrene copolymer is a brominated polybutadiene polystyrene block copolymer.

In some embodiments, the block copolymer is of Formula I

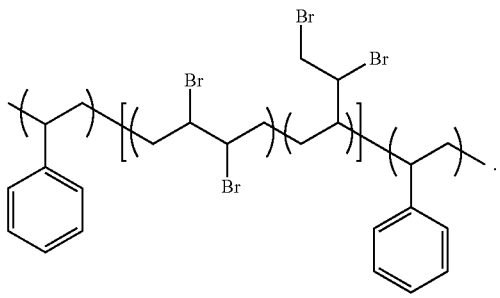

In some embodiments, the block copolymer comprises about 35 wt % to about 80 wt % of bromine.

In some embodiments, the polystyrene/first solvent mixture comprises about 5 wt % to about 30 wt %, about 10 wt % to about 25 wt %, or about 20 wt % polystyrene waste.

In some embodiments, the polystyrene/second solvent mixture comprises about 5 wt % to about 30 wt %, about 10 wt % to about 25 wt %, or about 20 wt % polystyrene waste.

In some embodiments, the brominated polybutadiene polystyrene copolymer is a brominated polybutadiene polystyrene block copolymer. In some embodiments, the brominated polybutadiene polystyrene block copolymer is a copolymer of Formula I.

In some embodiments, when the recycling comprises removal of the copolymer of Formula I, the recycled polystyrene comprises about 300 ppm or less than 300 ppm, about 200 ppm or less than 200 ppm, about 150 ppm or less than 150 ppm, about 135 ppm or less than 135 ppm, about 100 ppm or less than 100 ppm, about 85 ppm or less than 85 ppm, about 75 ppm or less than 75 ppm, about 65 ppm or less than 65 ppm, about 55 ppm or less than 55 ppm, about 45 ppm or less than 45 ppm, about 40 ppm or less than 40 ppm, about 20 ppm or less than 20 ppm, or about 10 ppm or less than 10 ppm of bromine, wherein the bromine is comprised in the copolymer of Formula I. In some embodiments, when the recycling comprises removal of the copolymer of Formula I, the recycled polystyrene comprises about 10 ppm to about 300 ppm, about 30 ppm to about 200 ppm, about 30 ppm, to about 150 ppm, about 30 ppm, to about 135 ppm, about 30 ppm to about 100 ppm, about 30 ppm to about 70 ppm, about 30 ppm to about 50 ppm, or about 30 ppm to about 40 ppm of bromine, wherein the bromine is comprised in the copolymer of Formula I.

EXAMPLES

The following non-limiting examples are illustrative of the present disclosure.
General Methods The polystyrene used is a post-industrial EPS material containing PFR for about 6400 ppm in bromine. Pure hexabromocyclododecane (HBCD) was used to add to the aforementioned polystyrene to model mix of polystyrene stream having both HBCD and PFR. HBCD and all the solvents were analytical grades and purchased from Sigma-Aldrich.

Example 1 General Method of the Present Disclosure

In general, polystyrene waste (e.g. post-industrial EPS material) was dissolved in the first solvent or the second solvent at 20 wt %. The resulting mixture was filtered at 1 µm or centrifugated at different RPM. The filtrate containing polystyrene was added to a stirred solution of the hydrocarbon non-solvent at its boiling point to precipitate polystyrene. The precipitated polystyrene was washed twice with further volumes of the hydrocarbon polystyrene non-solvent at the boiling point of the non-solvent. The washed polystyrene was optionally dried in a vacuum oven at about 130° C. for about 4 hours.

Example 2 Solubility of PFR in Benzenic Solvents

Experimental design has been established by using solvents of increasing steric hindrance. As seen in Table 1, monosubstituted benzenic solvents and their para-disubstituted homologous were compared. Impact of the solvent structure into the solubility of the block copolymer of Formula I in solution was investigated. While all these solvents have shown to be efficient to solubilize polystyrene, it is not the same case with PFR. Some of them present poor or no solubility, while other shown an iridescent solution, sign of potential lyotropic properties of PFR.

TABLE 1

Solubility of PFR

| | | | |
|---|---|---|---|
| Unsubstituted benzene |  Benzene Soluble | | |
| Monosubstituted benzenic solvents | 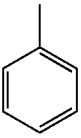 toluene Soluble Transparent solution | 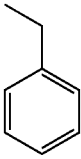 ethylbenzene Soluble (LC) Blue iridescent solution | 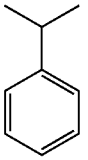 cumene Not soluble |
| Disubstituted benzenic solvents | 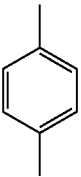 p-xylene Soluble (LC) Blue iridescent solution | 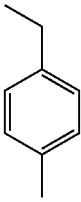 4-ethyltoluene Soluble (LC) Blue iridescent solution | 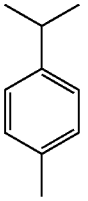 p-cymene Not soluble |

Example 3 Removal of HBCD

Table 2 shows that the HBCD can be removed from polystyrene waste material by using p-cymene and heptane as solvent/hydrocarbon polystyrene non-solvent combination. Here, as an example, it is shown that after three dissolution/precipitation cycles the HBCD concentration can be lower down to 0.53 ppm.

TABLE 2

Quantification of HBCD isomers before and after three dissolution/precipitation cycles with p-cymene and heptane (measured by UPLC-MS/MS)

| | EPS post-consumer (µg/g) | Recycled EPS post-consumer (µg/g) |
|---|---|---|
| α-HBCD | 862 | 0.22 |
| β-HBCD | 394 | 0.12 |
| γ-HBCD | 2591 | 0.19 |
| HBDC total | 3847 | 0.53 |

Example 4 Removal of PFR by Centrifugation Using Different Solvents

Different monocyclic aromatic solvents (p-cymene, p-xylene, toluene, and ethyl benzene) were used to solubilize polystyrene waste. Insoluble particles were observed when p-cymene was used as solvent. The solutions were centrifuged at different RPM (0 RPM, 2500 RPM (727 RCF), 4500 RPM (2354 RCF), 6500 RPM (4912 RCF), 8500 RPM (8399 RCF) and the bromine content assessed by X-ray fluorescence spectroscopy. The results are shown in FIG. 1.

FIG. 1 shows that depending on the benzenic solvent the solubility of PFR can be modulated. When lower solubility is observed, such as in p-cymene, PFR can be removed as a solid such as by centrifugation. Because of the gradient in particle size of insoluble PFR, and its polydispersity, it is possible to control the concentration of PFR in the final recycled material.

Example 5 Impact of Addition of Hydrocarbon Non-Solvent to Monocyclic Aromatic Benzenic Solvents Since PFR is insoluble in hydrocarbon polystyrene non-solvent, hydrocarbon polystyrene non-solvent was added to benzenic solvents including toluene, ethylbenzene and p-xylene to decrease PFR's solubility. 30 wt % of hydrocarbon polystyrene non-solvent such as heptane was added to toluene, p-xylene and ethylbenzene. The resulting solvent mixtures were used to solubilize polystyrene waste. 20 wt % solutions of polystyrene waste were prepared with the solvent mixtures. The polystyrene solutions were centrifuged at different speed (0 RPM, 2500 RPM (727 RCF), 4500 RPM (2354 RCF), 6500 RPM (4912 RCF), 8500 RPM (8399 RCF)) and the supernatant's bromine content assessed by X-Ray fluorescence spectroscopy. The results are shown in FIG. 2.

FIG. 2 shows that addition of hydrocarbon polystyrene non-solvent in benzenic solvents that were less effective at precipitating PFR was able to decrease the solubility of PFR in the benzenic solvents, while not significantly changing the solubility of PFR in solvents such as p-cymene (which had a low solubility for PFR). The insoluble PFR was removed from solutions of polystyrene by centrifugation.

Example 6 Removal of PFR by Filtration

Polystyrene waste was dissolved at 20 wt % in benzenic solvents including p-cymene, p-xylene, toluene and ethylbenzene, or solvent mixtures of 70 wt % benzenic solvents and 30 wt % hydrocarbon polystyrene non-solvent. The resulting mixtures were filtered with a 1 µm filter. The bromine content of the starting mixture and the filtered mixture in each case was assessed by X-ray fluorescence spectroscopy. The results are shown in FIG. 3.

For p-cymene, which as a low solubility for PFR, filtration was able to remove substantially all PFR from the polystyrene waste solution. In the case of p-xylene, toluene, and ethylbenzene, which were not able to precipitate PFR, addition of hydrocarbon polystyrene non-solvent decreased the solubility of PFR in the respective solvent. As shown in FIG. 3, filtration was able to remove PFR from the solutions of polystyrene waste in solvent mixtures comprising hydrocarbon polystyrene non-solvent and benzenic solvents.

Example 7 Removal of HBCD and Removal and Retention of PFR

Table 3 shows the removal of HBCD while retaining PFR in the recycled polystyrene. Different solvents and solvent mixtures (with hydrocarbon polystyrene non-solvent) were used and assessed. Toluene and p-xylene alone allowed for PFR to be retained in the recycled polystyrene, while HBCD was still removed. Solvent mixtures of toluene, p-xylene, or ethyltoluene, with hexane or heptane were able to remove both HBCD and PFR. In the case of p-cymene, p-cymene alone was able to remove both HBCD and PFR.

Concerning feedstock A, the process at pilot scale succeeded in removing 98.6% of HBCD with a final value of 69.3 ppm, which is below the threshold of 100 ppm required by European law for polystyrene materials. HBCD can be

TABLE 3

Removal of Brominated Contaminants

| solvent system for dissolution | non-solvent for precipitation | Theoretical HBDC (ppm) | treatment | Bromine in the starting material (ppm) | Bromine after treatment (ppm) | Final bromine after 1 recycling cycle (ppm) | Final bromine after 2 recycling cycle (ppm) |
|---|---|---|---|---|---|---|---|
| p-cymene | — | C7 | 0 | filtered 1 μm | 6365 | 85 | 64 | — |
| toluene | — | C6 | 0 | filtered 1 μm | 6410 | 5845 | 4692 | — |
| toluene (70 wt %) | C7 (30 wt %) | C7 | 0 | filtered 1 μm | 6410 | 85 | 51 | — |
| ethylbenzene (70 wt %) | C7 (30 wt %) | C7 | 0 | filtered 1 μm | 6200 | 60 | 38 | — |
| toluene (70 wt %) | C6 (30 wt %) | C6 | 4000 | filtered 1 μm | 9705 | 3605 | 559 | 199 |
| p-cymene | — | C7 | 4000 | filtered 1 μm | 9250 | 3330 | 349 | 120 |
| p-cymene (70 wt %) | C7 (30 wt %) | C7 | 4000 | filtered 1 μm | 9325 | 3550 | 469 | 129 |
| p-xylene | — | C7 | 4000 | filtered 1 μm | 9625 | 9605 | 5729 | 5728 |
| p-xylene (70 wt %) | C7 (30 wt %) | C7 | 4000 | filtered 1 μm | 9410 | 3470 | 433 | 120 |

Example 7 Selective Removal of HBCD and PFR

Two feedstock post-consumer polystyrene were used to test for selective removal of HBCD and PFR.
Feedstock A: containing HBCD
Feedstock B: containing HBCD+PFR
The method of the present disclosure was used to remove HBCD in both feedstocks and keep PFR in the feedstock B.

Both feedstocks have been treated at pilot scale with batches of 25 kg, following the same procedure. The feedstock was dissolved in a mix of p-cymene and heptane (70:30 wt %). After passing the resulting mixture through a 100 μm filter, polystyrene was precipitated from the solution by adding heptane at its boiling point in a continuous mode until a solvent composition of 70 wt % heptane and 30 wt % p-cymene was reached. Then, the precipitated polystyrene paste was washed continuously with a mix of 70 wt % heptane and 30 wt % p-cymene at the boiling point of heptane for about 1 hour to about 3 hours. The resulting paste was washed by pure heptane in continuous mode for about 0.5 hour, and further extruded, in order to generate pellets of recycled polystyrene. Bromine content was assessed by X-ray fluorescence (XRF) and by UPLC-MS/MS.

TABLE 4

Results for feedstock A

| Feedstock A | Br total - XRF | HBCD (ppm) - (UPLC-MS/MS) | Soluble Br (acetone extraction) - XRF |
|---|---|---|---|
| Starting material | 5947 | 5151 | 5227 |
| Recycled pellets | 300 | 69.3 | 80 |

TABLE 5

Results for feedstock B

| Feedstock B | Br total - XRF | Soluble Br (acetone extraction) - XRF | Insoluble Br |
|---|---|---|---|
| Starting material | 8984 | 5373 | 3611 |
| Recycled pellets | 2503 | 66 | 2437 | extracted from polystyrene material by acetone. This was done for the starting material and the recycled pellets. The acetone extract was analysed by XRF to verify the UPLC-MS/MS results. The results are shown in Table 4. The UPLC-MS/MS and the XRF results were similar.

For feedstock B, the starting material contained about 5373 ppm of soluble brominated compound (i.e. HBCD). Since PRF is not soluble in acetone and cannot be extracted, the difference between the total bromine content and the soluble bromine can be associated to non-soluble brominated compound (i.e. PFR). The bromine associated to PFR is therefore 3611 ppm in the starting material. In the recycled pellets from feedstock B, 98.8% of HBCD was removed, and 70% of the PFR was retained.

Example 8 Recovery of PFR from Black Polystyrene Feedstock

A black polystyrene feedstock was used to assess recovery of PFR. 40 g of the black polystyrene feedstock was dissolved into a mixture of 160 g of p-cymene and 48 g of heptane (77 wt % p-cymene: 23 wt % heptane) at 60° C. with stirring. When all the feedstock was dissolved, the solution was centrifuged at 8500 rpm for 10 min. The supernatant solution containing polystyrene was recovered. The polystyrene was then precipitated by adding the supernatant solution into 272 g of heptane at heptane's boiling point with vigorous stirring. The resulting paste of PS was then washed with 272 g of heptane twice at its boiling point. The washed PS paste was dried in a vacuum oven at 140° C. for 4 h. About 80 wt % of the initial feedstock has been recovered from the feedstock (Product A).

1 g of centrifuged insoluble residue was dispersed into 20 g of toluene. The resulting mixture was heated to 80° C. with vigorous stirring. The solution was then centrifuged at 8500 rpm for 10 min. The residue of centrifugation was washed with 10 g of fresh toluene twice, then centrifuged again at 8500 rpm for 10 min before being dried under vacuum at 140° C. for 4 h. The recovered residue was a carbonaceous material represented about 14 wt % from the feedstock (Product B). The toluene soluble fractions from the supernatant solutions were evaporated. The recovered evaporation residue was determined to be PFR and corresponded to about 1 wt % of the feedstock (Product C). The same product was able to be extracted with benzene or other substituted benzene solvents. Products A, B, and C were analysed by XRF. The results are shown in Table 9.

TABLE 9

Characterisation of Products A, B, and C by XRF

| Starting material (ppm) | Product A (ppm) | Product B (ppm) | Product C (ppm) |
|---|---|---|---|
| Zn 31 ± 5 |  | 200 ± 9 |  |
| Br 7514 ± 51 | 73 ± 8 | 2854 ± 36 | 57 000 ± 753 |
| Cl 50 ± 34 |  | 502 ± 65 |  |
| Se 37 ± 6 |  |  |  |
| Ca 44 ± 38 |  | 586 ± 71 |  |

The recovered carbonaceous material Product B contained common additives in polystyrene products such as one or more of graphite, graphene, carbon black, coke, char, tar, biochar, products and modified products of pyrolysis process. The carbonaceous material can further comprise carbonate such as calcium carbonate.

Product C was assessed using infrared (IR) and compared to commercial PFR and pure polystyrene. (FIG. 4) Product C showed a band corresponding to C—Br bond found in PFR but absent in polystyrene. Product C was also shown to contain polystyrene. It is noted that the residual polystyrene in Product C can be removed by washing Product C with a solvent that selectively dissolves polystyrene over PFR, for example a second solvent such as p-cymene. Nevertheless, Product C can also be used directly as PFR flame retardant additive for polystyrene product since the residual polystyrene would not interfere with the polystyrene already present in the polystyrene product.

While the present disclosure has been described with reference to examples, it is to be understood that the scope of the claims should not be limited by the embodiments set forth in the examples, but should be given the broadest interpretation consistent with the description as a whole. All publications, patents and patent applications are herein incorporated by reference in their entirety to the same extent as if each individual publication, patent or patent application was specifically and individually indicated to be incorporated by reference in its entirety. Where a term in the present disclosure is found to be defined differently in a document incorporated herein by reference, the definition provided herein is to serve as the definition for the term.

The invention claimed is:

1. Method of recycling a polystyrene waste,
the recycling comprising retention of a brominated polybutadiene polystyrene copolymer or removal of the brominated copolymer
when the recycling comprises retention of the brominated copolymer, the method comprising
dissolving the polystyrene waste in a first solvent, the first solvent being chosen from benzenes substituted with one or two substituents each chosen from $C_1$ and $C_2$ alkyl and mixtures thereof, to obtain a polystyrene/first solvent mixture,
adding the polystyrene/first solvent mixture to a first portion of hydrocarbon polystyrene non-solvent under conditions to obtain precipitated polystyrene and a first portion of hydrocarbon waste solution, the hydrocarbon polystyrene non-solvent being chosen from $C_5$ to $C_8$ hydrocarbon and mixtures thereof,
separating the precipitated polystyrene from the first portion of hydrocarbon waste solution, optionally repeating the dissolving, adding and separating,
washing the precipitated polystyrene with a second portion of hydrocarbon polystyrene non-solvent under conditions to obtain washed polystyrene and a second portion of hydrocarbon waste solution,
separating the washed polystyrene from the second portion of hydrocarbon waste solution,
washing the washed polystyrene with a third portion of hydrocarbon polystyrene non-solvent under conditions to obtain a twice washed polystyrene and a third portion of hydrocarbon waste solution,
separating the twice washed polystyrene from the third portion of hydrocarbon waste solution, and
optionally drying the twice washed polystyrene;
when the recycling comprises removal of the brominated copolymer, the method comprising
dissolving the polystyrene waste in a solvent mixture comprising about 50 wt % to about 90 wt % of a first solvent as defined above or a second solvent; and about 10 wt % to about 50 wt % of a hydrocarbon polystyrene non-solvent as defined above, to obtain a polystyrene/second solvent mixture and a solid comprising the brominated copolymer,
the second solvent being chosen from benzenes substituted with one or two substituents each chosen from $C_1$ to $C_4$ alkyl, wherein at least one of the one or two substituents is isopropyl,
separating the solid comprising the brominated copolymer from the polystyrene/second solvent mixture,
adding the polystyrene/second solvent mixture to a first portion of hydrocarbon polystyrene nonsolvent under conditions to obtain precipitated polystyrene and a first portion of hydrocarbon waste solution,
separating the precipitated polystyrene from the first portion of hydrocarbon waste solution, optionally repeating the dissolving, adding and separating,
washing the precipitated polystyrene with a second portion of hydrocarbon polystyrene non-solvent under conditions to obtain washed polystyrene and a second portion of hydrocarbon waste solution,
separating the washed polystyrene from the second portion of hydrocarbon waste solution,
washing the washed polystyrene with a third portion of hydrocarbon polystyrene non-solvent under conditions to obtain a twice washed polystyrene and a third portion of hydrocarbon waste solution,
separating the twice washed polystyrene from the third portion of hydrocarbon waste solution, and
optionally drying the twice washed polystyrene.

2. The method of claim 1, wherein the polystyrene waste further comprises carbonaceous additives and the solid comprising the brominated copolymer further comprises the carbonaceous additives, optionally the carbonaceous additives are one or more of graphite, graphene, carbon black, coke, char, tar, biochar, products and modified products of pyrolysis process.

3. The method of claim 2, wherein the method further comprises recovering the carbonaceous additives from the solid comprising the brominated copolymer by dispersing the solid comprising the brominated copolymer in a first solvent to obtain a first solvent/copolymer solution comprising the brominated copolymer and a solid residue comprising the carbonaceous additives.

4. The method of claim 1, wherein the separating of the solid comprising the brominated copolymer is performed by filtration, centrifugation, decantation, sedimentation, or combinations thereof.

5. The method of claim 4 wherein the filtration is performed with a filter of about 0.25 μm to about 1000 μm, about 0.25 μm to about 800 μm, about 0.25 μm to about 600 μm, about 0.25 μm to about 400 μm, about 0.25 μm to about 200 μm, about 0.25 μm to about 100 μm, about 0.25 μm to about 50 μm, about 0.25 μm to about 30 μm, about 0.25 μm to about 20 μm, about 0.25 μm to about 10 μm, about 0.25 μm to about 5 μm, about 0.25 to about 3 μm, about 0.5 μm to about 2 μm, about 0.5 μm to about 1.5 μm, or about 1 μm.

6. The method of claim 4, wherein the centrifugation is performed at about 1500 rpm or more than 1500 rpm, about 1500 rpm to about 10000 rpm, about 2000 rpm to about 9500 rpm, about 3000 rpm to about 9500 rpm, optionally for about 5 seconds to about 20 min, about 3 min to about 10 min, about 5 sec to about 5 min, about 10 sec to about 10 min, about 10 sec to about 5 min, about 5 min to about 15 min, or about 10 sec to about 2 min.

7. The method of claim 6, wherein the centrifugation is performed about 4000 rpm to about 9500 rpm, or about 4000 rpm or more than 4000 rpm.

8. The method of claim 1, wherein the first solvent is chosen from toluene, ethylbenzene, p-xylene, p-ethyltoluene, and mixtures thereof, optionally the first solvent is toluene, ethylbenzene, or mixtures thereof.

9. The method of claim 1, wherein the hydrocarbon polystyrene non-solvent is chosen from $C_6$ to $C_8$ alkanes and mixtures thereof.

10. The method of claim 1, wherein the hydrocarbon polystyrene non-solvent is chosen from $C_6$ to $C_7$ alkanes, and mixtures thereof.

11. The method of claim 1, wherein the hydrocarbon polystyrene non-solvent is n-pentane, pentanes, hexanes, n-hexane, heptanes, or n-heptane.

12. The method of claim 1, wherein the second solvent is chosen from cumene, p-cymene, the solvent mixture, and mixtures thereof.

13. The method of claim 1, wherein the solvent mixture comprises about 60 wt % to about 80 wt % of the first solvent and about 20 wt % to about 40 wt % of the hydrocarbon polystyrene non-solvent.

14. The method of claim 1, wherein the solvent mixture comprises about 65 wt % to about 75 wt % of the first solvent and about 25 wt % to about 35 wt % of the hydrocarbon polystyrene non-solvent.

15. The method of claim 1, wherein the solvent mixture comprises about 70 wt % of the first solvent and about 30 wt % of the hydrocarbon polystyrene non-solvent.

16. The method of claim 1, wherein the second solvent is p-cymene.

17. The method of claim 1, wherein the second solvent is about 70 wt % toluene/about 30 wt % n-heptane, about 70 wt % ethylbenzene/about 30 wt % n-heptane, about 70 wt % toluene/about 30 wt % n-hexane.

18. The method of claim 1, wherein the dissolving, adding and washing are each performed with agitation, optionally by a mechanical stirrer.

19. The method of claim 1 further comprising recovering the removed brominated copolymer.

* * * * *